United States Patent
Sano et al.

(10) Patent No.: US 7,283,710 B2
(45) Date of Patent: Oct. 16, 2007

(54) OPTICAL WAVEGUIDE DEVICE

(75) Inventors: Akihiko Sano, Joyo (JP); Shuichi Misumi, Yokohama (JP); Eiichi Omura, Nara (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/214,650

(22) Filed: Aug. 30, 2005

(65) Prior Publication Data

US 2006/0045427 A1    Mar. 2, 2006

(30) Foreign Application Priority Data

Aug. 30, 2004    (JP) .............................. 2004-249749

(51) Int. Cl.
    *G02B 6/30*    (2006.01)
(52) U.S. Cl. ........................................................ 385/49
(58) Field of Classification Search .................... None
    See application file for complete search history.

(56) References Cited

U.S. PATENT DOCUMENTS

| | | | | |
|---|---|---|---|---|
| 5,465,312 A | * | 11/1995 | Maxwell et al. | 385/49 |
| 5,480,764 A | * | 1/1996 | Gal et al. | 430/321 |
| 5,546,483 A | * | 8/1996 | Inoue et al. | 385/14 |
| 6,231,771 B1 | * | 5/2001 | Drake | 216/24 |
| 6,507,680 B1 | * | 1/2003 | Nishimura et al. | 385/14 |
| 6,879,757 B1 | * | 4/2005 | Zhou et al. | 385/49 |
| 2002/0168168 A1 | * | 11/2002 | Iravani | 385/136 |
| 2004/0071405 A1 | * | 4/2004 | Baney et al. | 385/50 |
| 2004/0165812 A1 | * | 8/2004 | Blauvelt et al. | 385/14 |

* cited by examiner

*Primary Examiner*—Michelle Connelly-Cushwa
*Assistant Examiner*—Chris H. Chu
(74) *Attorney, Agent, or Firm*—Osha Liang L. L. P.

(57) ABSTRACT

Optical fiber guides are provided outside a waveguide mounting region of a supporting substrate. Optical fibers are provided so as to be fitted in the optical fibers, respectively. In addition, end faces of the optical fibers and end faces to which a core of an optical waveguide is exposed are opposed and almost parallel to each other. Furthermore, the end face to which the core of the optical waveguide is exposed is provided so as to form an acute angle with a surface of the supporting substrate. Thus, tip ends of the optical fibers are not likely to be shifted from the core in a thickness direction of an optical waveguide device.

3 Claims, 24 Drawing Sheets

OPTICAL WAVEGUIDE DEVICE

BACKGROUND OF THE INVENTION

1. Field of the Invention

The present invention relates to an optical waveguide device.

2. Description of the Background Art

Recently, communication using an optical fiber in which large-volume data can be transmitted at high speed has prevailed, and electric appliances (such as a personal computer, a television, a DVD and the like) used in such communication has been widely spread at home and the like. Thus, an optical waveguide device used at a connection part with an optical fiber, a light source, a light detecting element and the like is required to be inexpensive and suitable for mass-production.

The optical waveguide device is constituted by mounting an optical waveguide comprising a core and a clad on a substrate in which an optical fiber guide such as a V groove is formed. Conventionally, as a manufacturing method of the optical waveguide device which is inexpensive and suitable for mass-production, a method of duplicating the optical waveguide (or stamping method) has been well known. According to the duplication method, a transparent resin which will become a clad layer is pressed with a stamper to form a groove and cured and then the groove is filled with a transparent resin of a core material and pressed by a flat plate and the like to form a core of the optical waveguide.

According to this method, after many grooves of the optical waveguides are formed in a large-area clad layer at the same time, cores are formed in the grooves, and they are bonded to the substrate in which the optical fiber guides are formed and cut into a plurality of chips. As a result, many optical waveguide devices can be manufactured at one time.

However, even when the optical waveguide devices can be mass-produced, if it is complicated to adjust and fix a position to set another member such as an optical fiber to be connected to the core of the optical waveguide, final productive efficiency is not improved.

Thus, there is proposed a method of aligning a core end of the optical waveguide with the optical fiber correctly. FIG. 1 shows an exploded perspective view to explain a conventional optical waveguide device 1 integrated with an optical fiber guide.

The optical waveguide device 1 comprises a substrate 8 comprising optical fiber guides 4a to 4c on its surface, a first clad layer 2a formed on the substrate 8 and comprising a Y-shaped core 5 formed in a groove 3, a second clad layer 2b formed so as to cover the core 5 and an upper face of the first clad layer 2a, and a cover glass 6. The optical fiber guides 4a to 4c are grooves to position optical fibers 7a to 7c and have V-shaped section.

Here, the optical fibers 7a to 7c are fitted in the optical fiber guides 4a to 4c so that optical axes of the optical fibers 7a to 7c coincide with an optical axis of the core 5 as shown in FIG. 2A. In other words, they are arranged so that core end faces of the optical fibers 7a to 7c coincide with an end face of the core 5. In addition, the optical fibers 7a to 7c are fixed to the substrate 8 over almost entire lengths of the optical fiber guides 4a to 4c with an adhesive agent applied to a space between the optical fiber guides 4a to 4c and the optical fibers 7a to 7c.

However, according to the optical waveguide device having the above constitution, the optical fibers 7a to 7c are positioned in a width direction of the optical waveguide device 1 by the optical fiber guides 4a to 4c but they are not positioned in a thickness direction. When the optical fibers 7a to 7c are fixed with the adhesive agent in this state, tip ends of the optical fibers 7a to 7c lift from the optical fiber guides 4a to 4c because of undulation of the optical fibers 7a to 7c caused by warp age of the optical fibers 7a to 7c themselves or hardening shrinkage of the adhesive agent in the length direction of the optical fibers 7a to 7c. As a result, as shown in FIGS. 2B and 2C, the optical fibers 7a to 7c are shifted upward at the time of bonding in some cases. In addition, when the tip ends of the optical fibers 7a to 7c lift, since they are separated from the optical fiber guides 4a to 4c, the optical fibers 7a to 7c are not positioned in the width direction of the optical waveguide device 1 also.

Thus, when the optical fibers 7a to 7c are shifted from the end faces of the core 5 of the optical waveguide, the optical axes of the optical fibers 7a to 7c are shifted from that of the core 5, so that insertion loss of light from the optical fibers 7a to 7c to the core 5, or from the core 5 to the optical fibers 7a to 7c deteriorates. Therefore, it is necessary to align the end face of the optical fiber and the end face of the core of the optical waveguide so as not to be shifted and to fix them with a cover from above.

SUMMARY OF THE INVENTION

In accordance with one aspect of present invention, an optical waveguide device comprises a substrate having an optical fiber mounting region in which an optical fiber guide is formed to mount an optical fiber and an optical waveguide mounting region, an optical waveguide provided in the optical waveguide mounting region and comprising a core to propagating light and a clad layer surrounding the core, and an optical fiber held by the optical fiber guide, and the optical waveguide has a slanted face slanting from a face perpendicular to a length direction of the optical fiber guide so as to extend above the optical fiber guide, in at least one part of an end face of the optical waveguide, and at least one part of an end face of the optical fiber held by the optical fiber guide is in contact with the slanted face provided on the end face of the optical waveguide.

In accordance with another aspect of present invention, an optical waveguide device comprises a substrate having an optical fiber mounting region in which an optical fiber guide is formed to mount an optical fiber and an optical waveguide mounting region, an optical waveguide provided in the optical waveguide mounting region and comprising a core to propagating light and a clad layer surrounding the core, and an optical fiber held by the optical fiber guide, and the optical fiber held in the optical fiber guide is elastically curved so that it is bent toward the substrate side.

In accordance with another aspect of present invention, an optical waveguide device comprises a substrate having an optical fiber mounting region in which an optical fiber guide is formed to mount an optical fiber and an optical waveguide mounting region, an optical waveguide provided in the optical waveguide mounting region and comprising a core to propagating light and a clad layer surrounding the core, and an optical fiber held by the optical fiber guide, and a part of an end face of the optical waveguide protrudes above the optical fiber guide, and an end face of the optical fiber that is held by the optical fiber guide is sandwiched between the projecting part of the end face of the optical waveguide and the optical fiber guide.

DESCRIPTION OF THE PREFERRED EMBODIMENTS

First Embodiment

Figure 1:
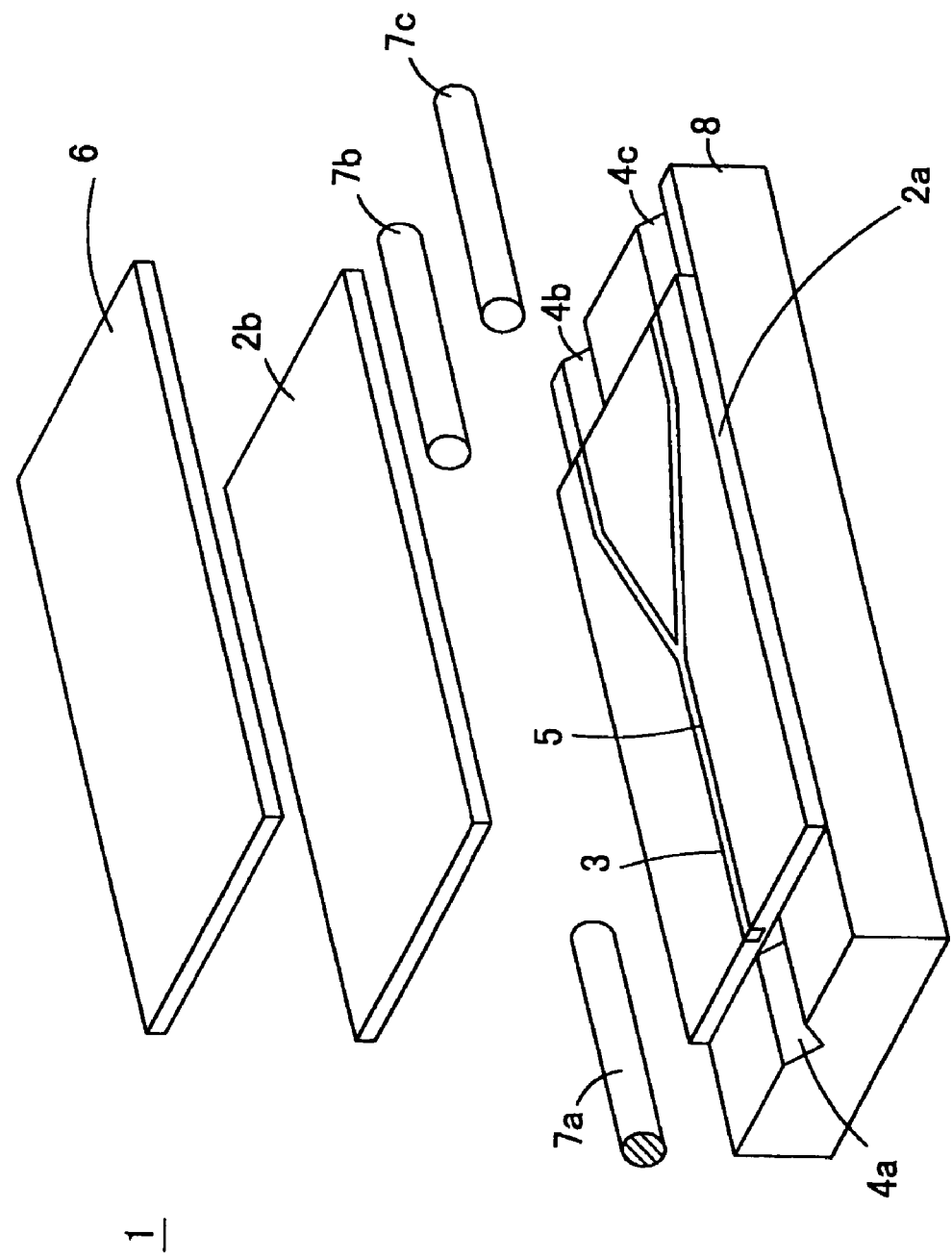
FIG. 1 shows a schematic exploded perspective view to explain a conventional optical waveguide device provided with an optical fiber guide.
Figure 2:
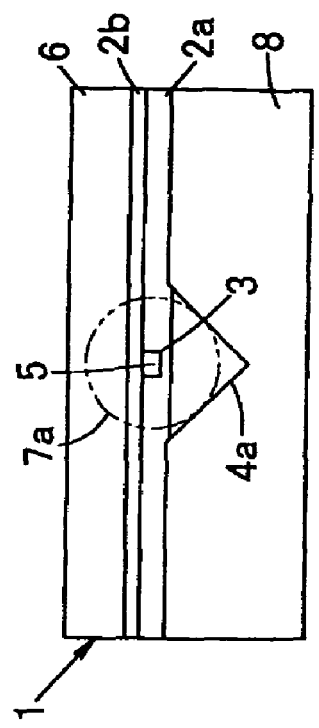
FIG. 2A shows a front view of the optical waveguide device in a state the optical fiber is correctly positioned.
FIG. 2B shows a front view of the optical waveguide device in a state a tip end of the optical fiber lifts.
FIG. 2C shows a side view of the optical waveguide device in the state the tip end of the optical fiber lifts.
Figure 2:
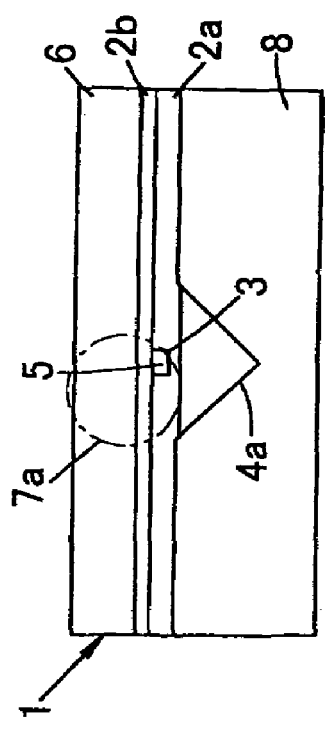
Figure 2:
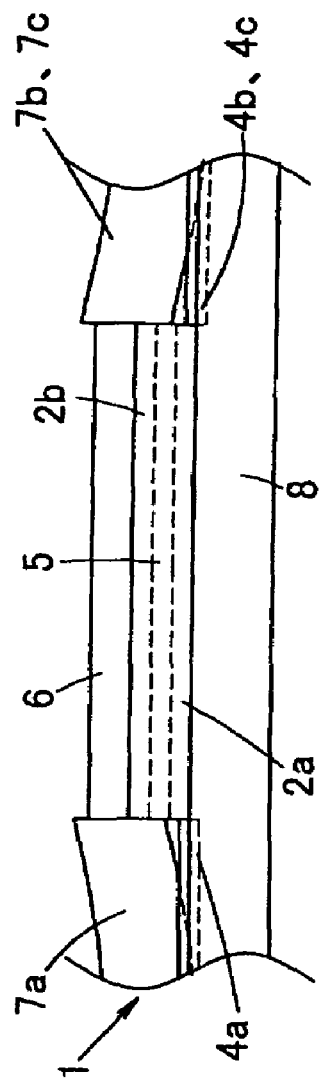

An embodiment of the present invention will be described with reference to FIGS. 3 and 4. An optical waveguide device 9 comprises a mounting substrate 10 and an optical waveguide 11. The optical waveguide 11 comprises a cover glass 12, a lower clad layer 13 formed of a translucent material, a core 14 formed of an optical material having a refractive index higher than that of the lower clad layer 13 and propagating light inside, and an upper clad layer 15 formed of the same optical material as that of the lower clad layer 13.

Meanwhile, according to the mounting substrate 10, a waveguide mounting region 17a for laminating the optical waveguide 11 is formed on the center of the surface of the supporting substrate 16 and an optical fiber mounting region 17b is formed on each side thereof. Optical fiber guides 18a to 18c for positioning optical fibers 20a to 20c are provided in the optical fiber mounting region 17b. The optical fiber guides 18a to 18c may have any sectional configuration such as a V-shaped groove, an angular groove, a round groove and the like. In addition, the entire upper surface of the supporting substrate 16 other than the waveguide mounting region 17a is covered with a metal thin film 19 such as In, Au and the like. Although a silicon substrate is used for the supporting substrate 16 in this embodiment, a glass substrate or the like may be used also. In addition, when the silicon substrate is used as the supporting substrate 16, the surface of the supporting substrate 16 is oxidized to form a $SiO_2$ film and then the metal thin film 19 may be formed thereon.

According to the optical waveguide 11, the cover glass 12 is formed as a lowermost layer, and the lower clad layer 13, the core 14 and the upper clad layer 15 are sequentially formed thereon. Then, as shown in FIG. 3, it is turned upside down and set on the waveguide mounting region 17a of the mounting substrate 10. The optical fiber guides 18a and 18c are provided in the optical fiber mounting region 17b and exposed from the optical waveguide 11. As shown in FIG. 4, the core 14 is exposed to an end face of the optical waveguide 11 which is opposed to the optical fiber guides 18a to 18c. An optical axis of the core 14 at each end coincides with the center of each of the optical fiber guides 18a to 18c in a plane.

Figure 4:
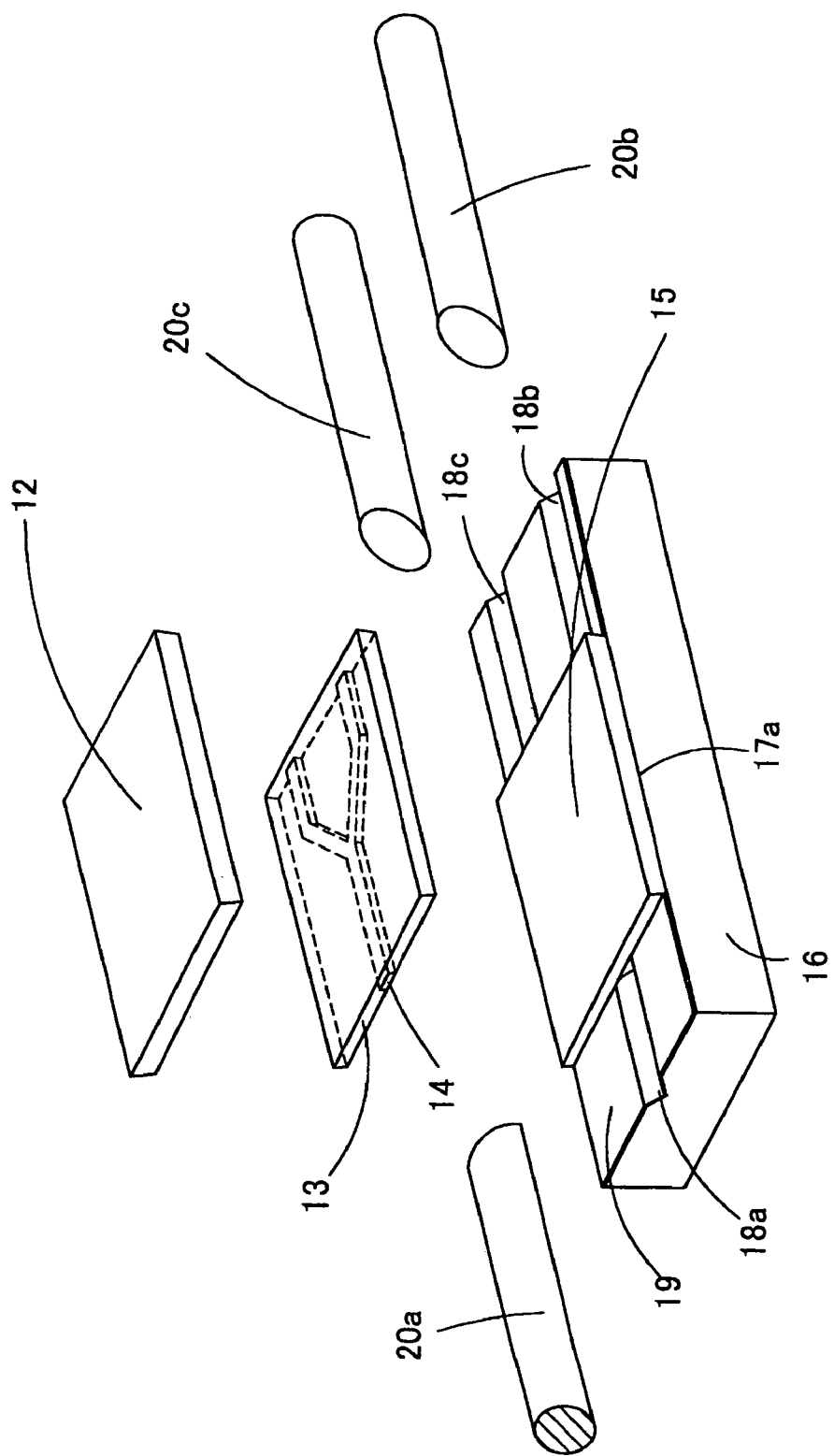
FIG. 4 shows an exploded perspective view of the optical waveguide device according to the embodiment in FIG. 2.

Furthermore, as shown in FIG. 4, the end face of the optical waveguide 11 to which the core 14 is exposed is slanted from a plane perpendicular to a length direction (axis direction) of the optical fiber guides 18a to 18c in such a manner that its upper part extends above the optical fiber guides 18a to 18c. Although an outward normal line of the end face of the optical waveguide 11 is contained in a plane which is vertical to the upper face of the supporting substrate 16 and parallel to the length direction of the optical fiber guides 18a to 18c in the illustrated example, that outward normal line may get out of that plane as long as it faces downward from the horizontal direction which is parallel to the upper face of the supporting substrate 16.

Figure 3:
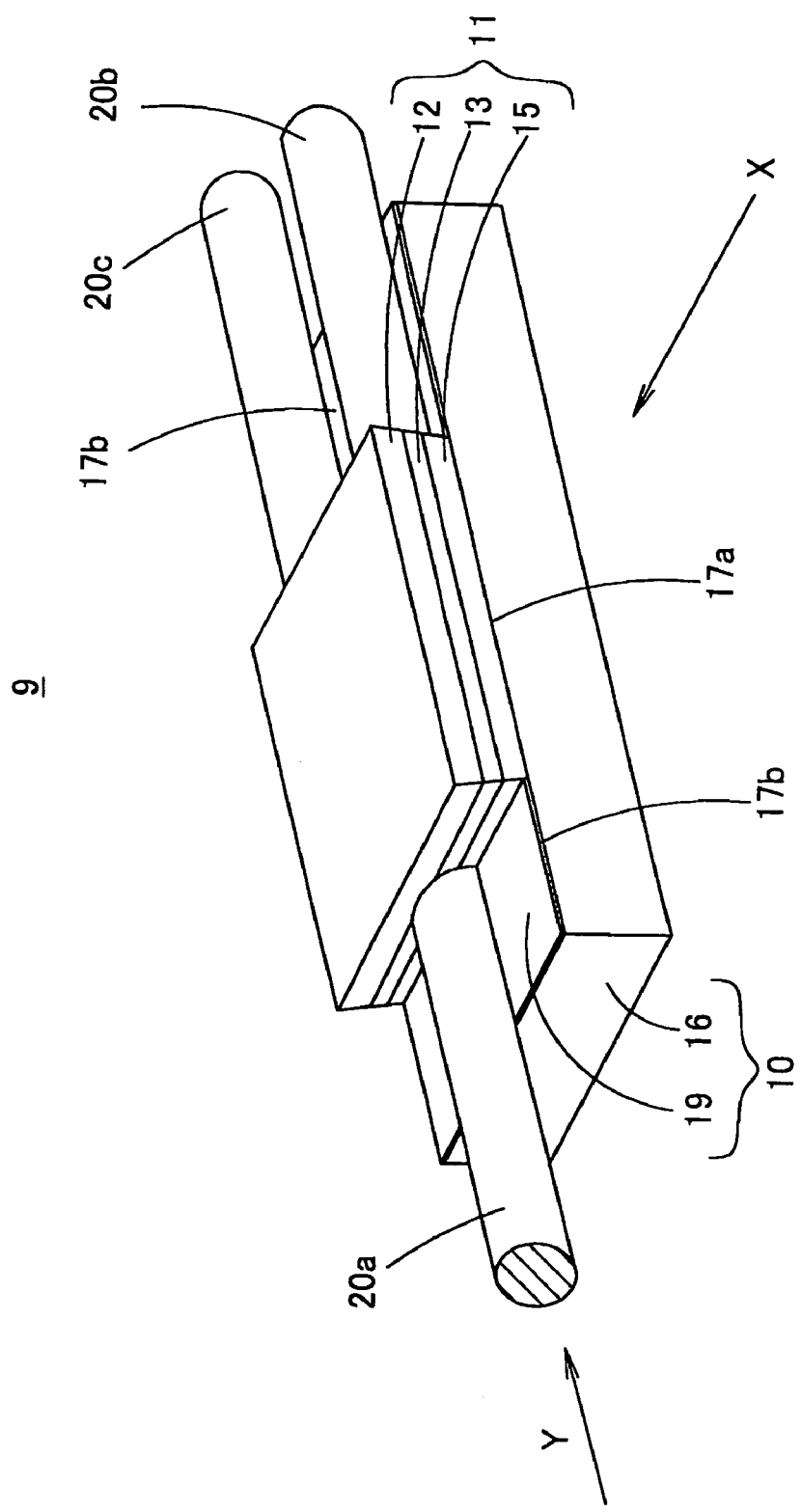
FIG. 3 shows a perspective view of an optical waveguide device according to an embodiment of the present invention.
Figure 5:
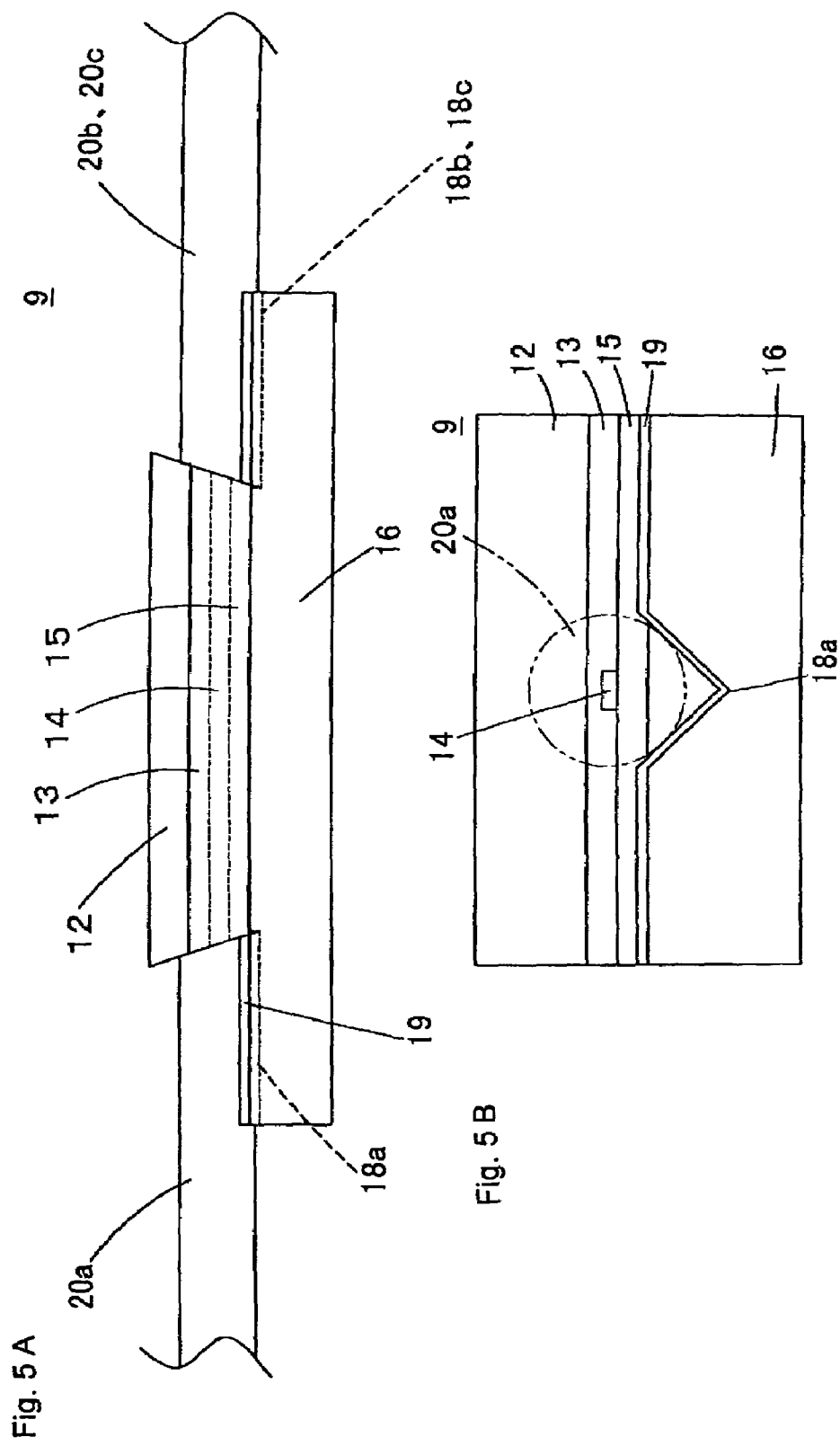
FIG. 5A shows a view of the optical waveguide device according to the embodiment in FIG. 2 taken in the direction of arrow X in FIG. 3.
FIG. 5B shows a view of the optical waveguide device according to the embodiment in FIG. 2 taken in the direction of arrow Y in FIG. 3.

FIG. 5A shows a state in which the optical fibers 20a to 20c are mounted on the optical waveguide device 9, which is a view taken in the direction of arrow X in FIG. 3. FIG. 5B shows a view of a state in which the optical fibers 20a to 20c are mounted on the optical waveguide device 9, taken in the direction of arrow Y in FIG. 3. The optical fibers 20a to 20c are fitted and positioned in the optical fiber guides 18a to 18c to be fixed therein, respectively, so that the optical axis of the core 14 is automatically aligned with the optical axes of the optical fibers 20a to 20c. Here, an upper face of the optical waveguide 11 is positioned higher than an upper faces of the optical fibers 20a to 20c, and an upper face of the lower clad layer 13 is positioned lower than the upper faces of the optical fibers 20a to 20c. In addition, the end faces of the optical fibers 20a to 20c opposed to the core 14 are cut so as to be almost parallel to the end face of the optical waveguide 11. Here, the term "almost parallel" means that the end faces of the optical fibers 20a to 20c are within a range of ±3° from a parallel line with respect to the end face of the optical waveguide 11.

Thus, in a state the optical fibers 20a to 20c are positioned in the optical fiber guides 18a to 18c, respectively and connected to the optical waveguide 11, the end faces of the optical fibers 20a to 20c are entirely in contact with the end face of the optical waveguide 11, and the tip end faces of the optical fibers 20a to 20c are pressed downward so as to get into under the slanted end faces of the optical waveguide 11. Therefore, the optical fibers 20a to 20c are positioned in a thickness direction of the optical waveguide device 9 and prevented from lifting and also positioned in a width direction of the optical fibers 20a to 20c on the optical waveguide device 9 by the optical fiber guides 18a to 18c which are the V-shaped grooves. Therefore, when the optical fibers 20a to 20c are connected to the optical waveguide 11, misaligned between the optical axes of the optical fibers 20a to 20c and the optical axis of the core 14 of the optical waveguide 11 due to lifting of the end faces of the optical fibers 20a to 20c is prevented.

In addition, since the tip ends of the optical fibers 20a to 20c get into under the end faces of the optical waveguide 11 and pressed downward at the end face of the optical waveguide 11, even when bonding force of an adhesive agent is lowered by a change over time, the tip ends of the optical fibers 20a to 20c are prevented from lifting, so that the optical axis of the core 14 is prevented from deviating from the optical axes of the optical fibers 20a to 20c. In addition, a cover for pressing and fixing the optical fibers 20a to 20c is not necessary but when the cover is used together, the optical fibers 20a to 20c can be more stably held.

Figure 6:
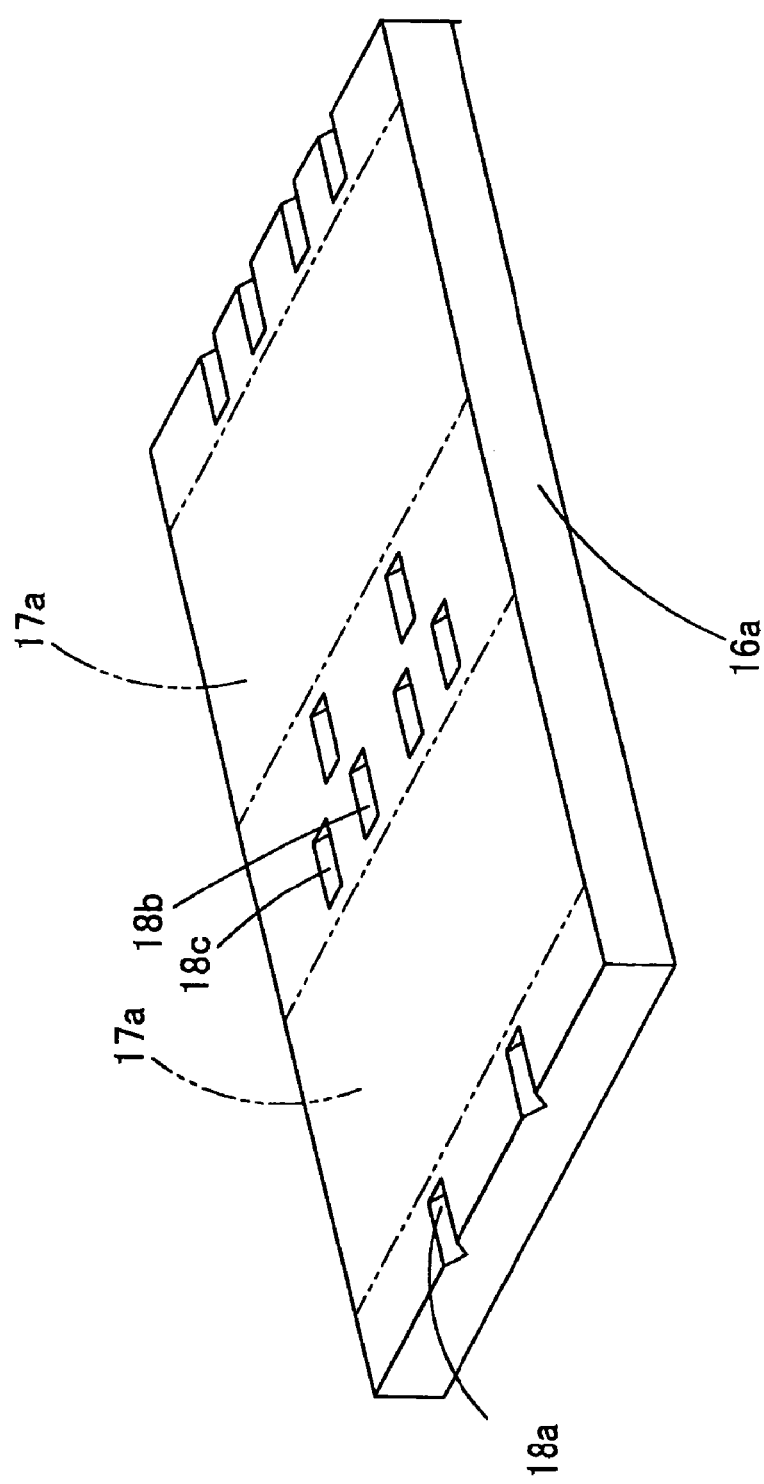
FIG. 6 shows a view to explain a manufacturing method of the optical waveguide device according to the embodiment in FIG. 2.

A method of manufacturing the optical waveguide device 9 according to an embodiment of the present invention will be described with reference to FIGS. 6 to 13 hereinafter. According to the supporting substrate 16, a surface of a silicon substrate (wafer) 16a is etched away and flat waveguide mounting regions 17a and the optical fiber guides 18a to 18c are formed thereon as shown in FIG. 6. Although when the silicon substrate 16a shown in FIG. 6 is used, four mounting substrates 10 can be manufactured at one time, when a larger silicon substrate 16a is used, the mounting substrates 10, that is, the optical waveguide devices 9 can be mass-produced.

Figure 7:
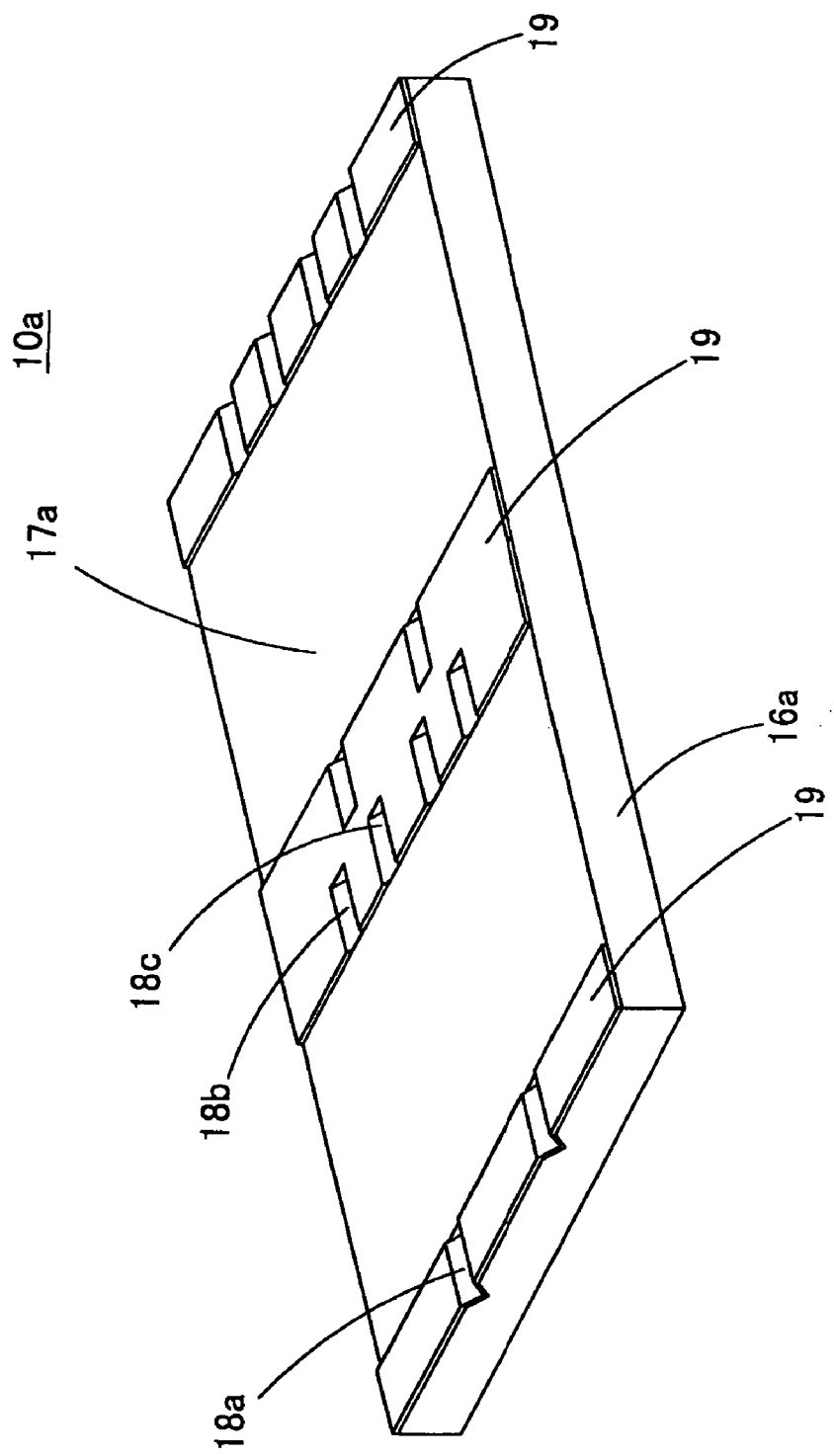
FIG. 7 shows a sequential view of FIG. 6.

As shown in FIG. 7, the metal thin film 19 is formed on the surface of the silicon substrate 16a other than the waveguide mounting region 17a by vapor depositing, sputtering, or electroless depositing such metals as Ni, Au and the like. The silicon substrate 16a on which the metal thin film 19 is formed is referred to as a base substrate 10a hereinafter.

Figure 8:
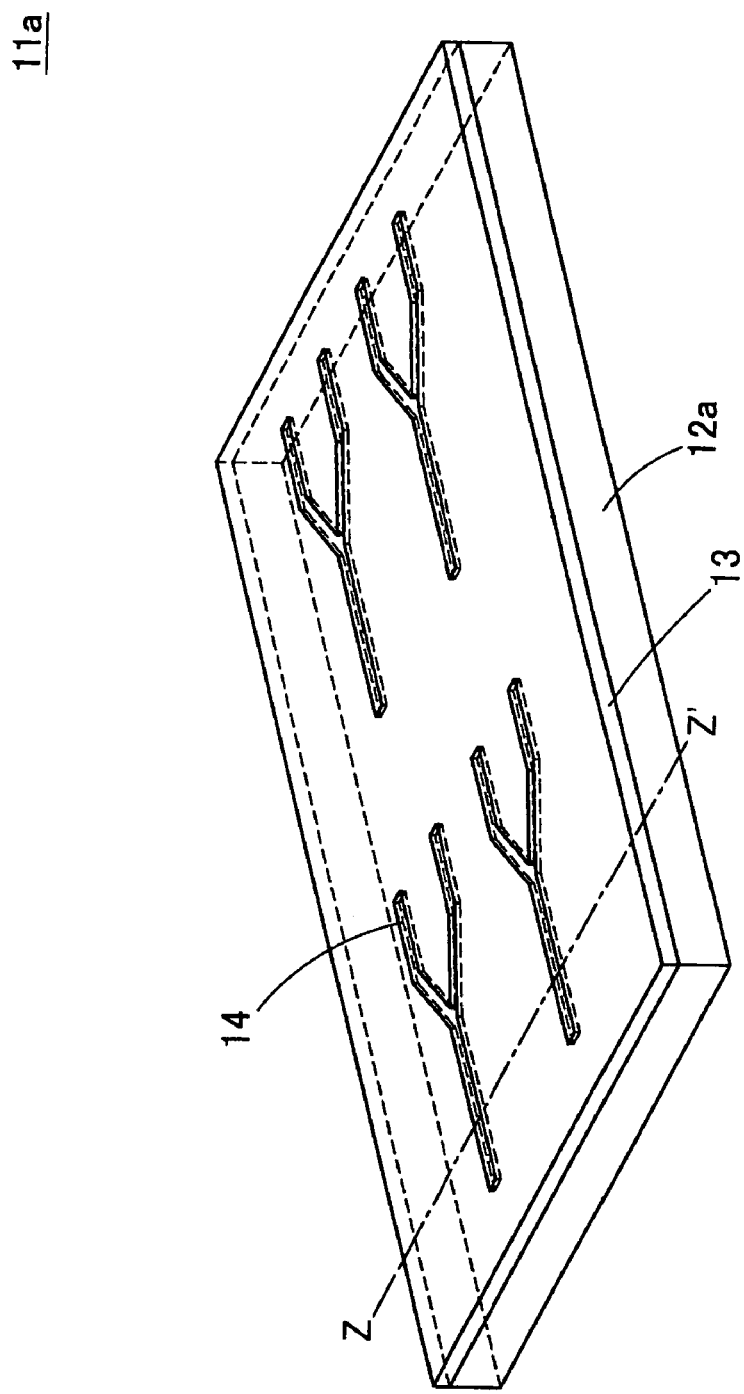
FIG. 8 shows a sequential view of FIG. 7.

Meanwhile, using a glass substrate 12a having the same area or more of the silicon substrate 16a, a mother substrate of the optical waveguide 11 (optical waveguide mother substrate 11a) comprising the lower clad layer 13 and the core 14 shown in FIG. 8 is formed by a duplication method (stamping method). The glass substrate (wafer) 12a is a mother substrate of the cover glass 12 of the optical waveguide device 9.

Figure 9:
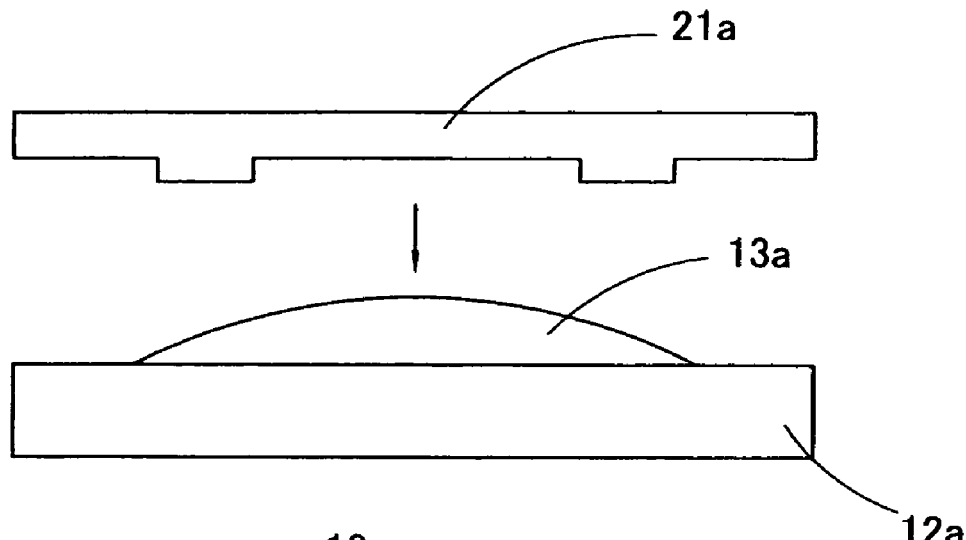
FIG. 9A-FIG. 9D show views of schematic manufacturing steps of FIG. 8.
Figure 9:
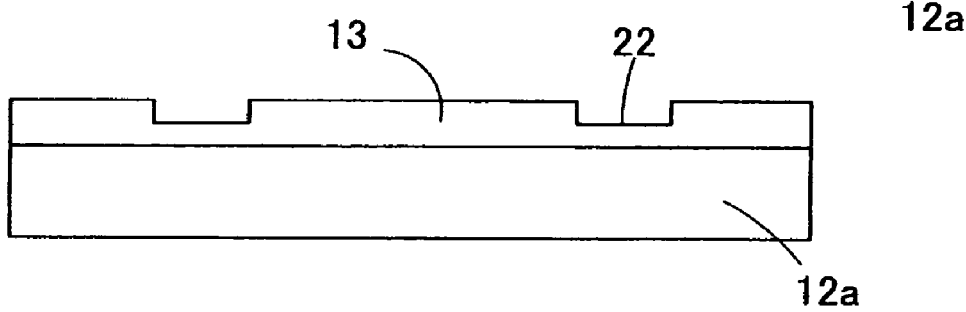
Figure 9:
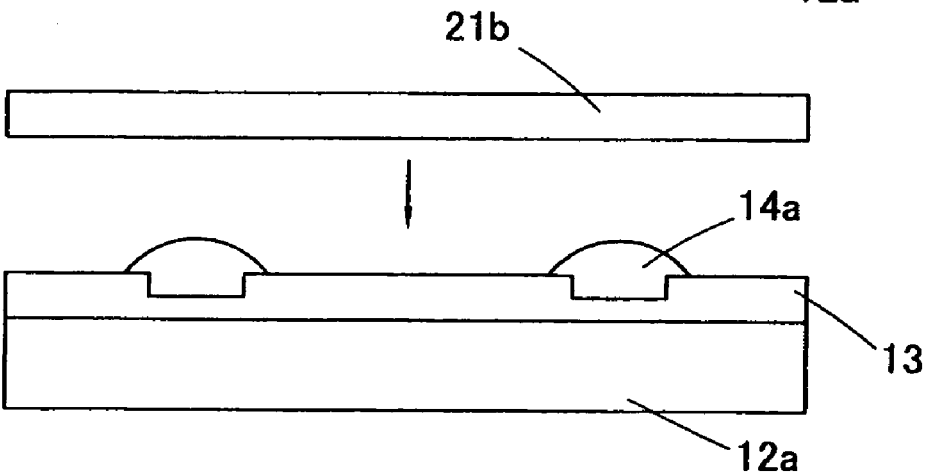
Figure 9:
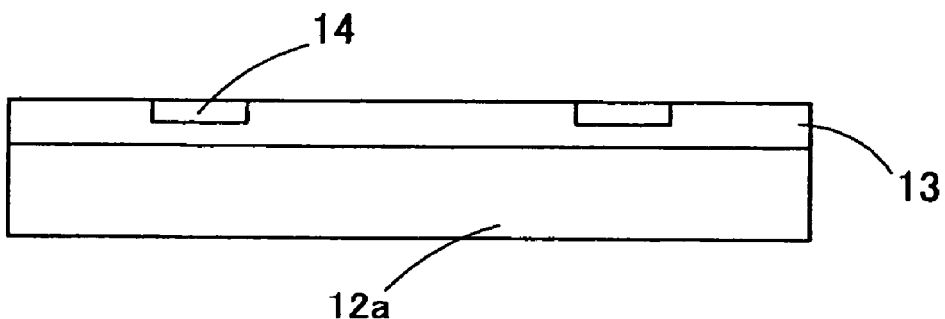

Here, the duplication method (stamping method) using an UV cured resin will be briefly described with reference to FIG. 9. FIGS. 9A, 9B, 9C and 9D show sectional views taken along line Z-Z' in FIG. 8. First, as shown in FIG. 9A, an uncured UV cured resin (lower clad resin) 13a is dropped on the glass substrate 12a and a core groove 22 is formed in the surface by pressing the UV cured resin 13a with a stamper (mold) 21a having the same configuration as that of the core 14. Then, the UV cured resin 13a is cured by irradiation with ultraviolet and the lower clad layer 13 having the core groove 22 is molded as shown in FIG. 9B.

Then, an uncured UV cured resin (core resin) 14a having an refractive index higher than that of the lower clad layer 13 is poured in the core groove 22 molded in the lower clad layer 13. Then, it is pressed by a stamper 21b so that its surface becomes flat and a thickness of a burr formed on the surface of the lower clad layer 13 by the UV cured resin 14a which overflowed from the core groove 22 becomes extremely thin. Then, the UV cured resin 14a is cured by irradiation with ultraviolet and the core 14 is formed in the core groove 22 as shown in FIG. 9D.

Figure 10:
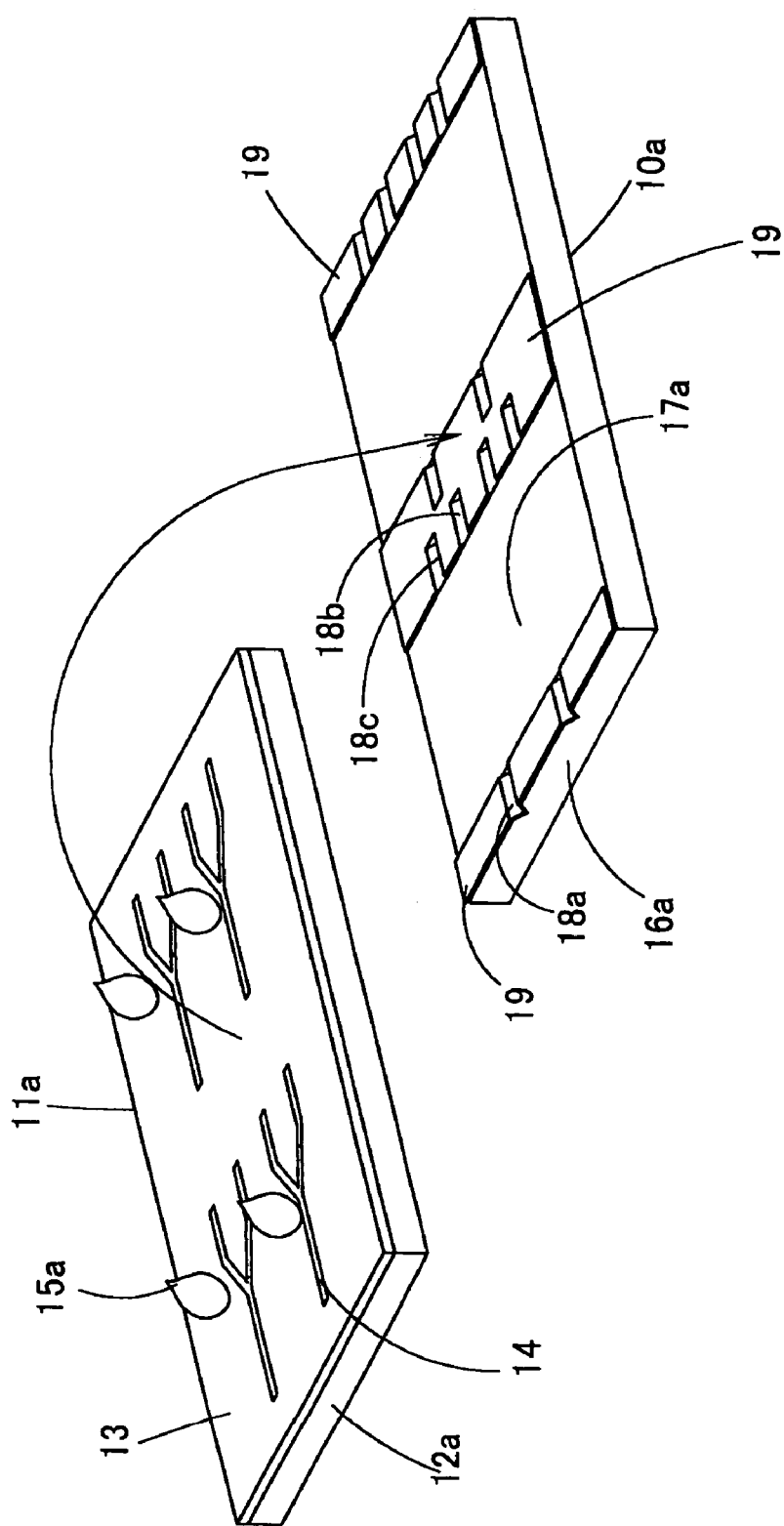
FIG. 10 shows a sequential view of FIG. 8.

Then, as shown in FIG. 10, an uncured resin 15a is dropped on the surface of the optical waveguide mother substrate 11a and the optical waveguide mother substrate 11a is bonded to the base substrate 10a with the resin 15a. In addition, since the resin 15a becomes the upper clad layer 15 after cured, it is preferable that the resin 15a is the same UV cured resin as that of the lower clad layer 13 or it has the same refractive index as that of the lower clad layer 13 and its refractive index has to be lower than that of the core 14 at least.

When the base substrate 10a and the optical waveguide mother substrate 11a are bonded, it is necessary to precisely align the optical fiber guides 18a to 18c with the core 14. In order to implement that, the optical waveguide mother substrate 11a and the base substrate 10a are bonded by precisely aligning an alignment mark provided in the optical waveguide mother substrate 11a with an alignment mark provided in the base substrate 10a. When the large-sized base substrate 10a and the large-sized optical waveguide mother substrate 11a are aligned, since it is not necessary to align individual parts with each other, the plurality of cores and fiber guides and the like can be precisely aligned at one time, which is very effective.

Figure 11:
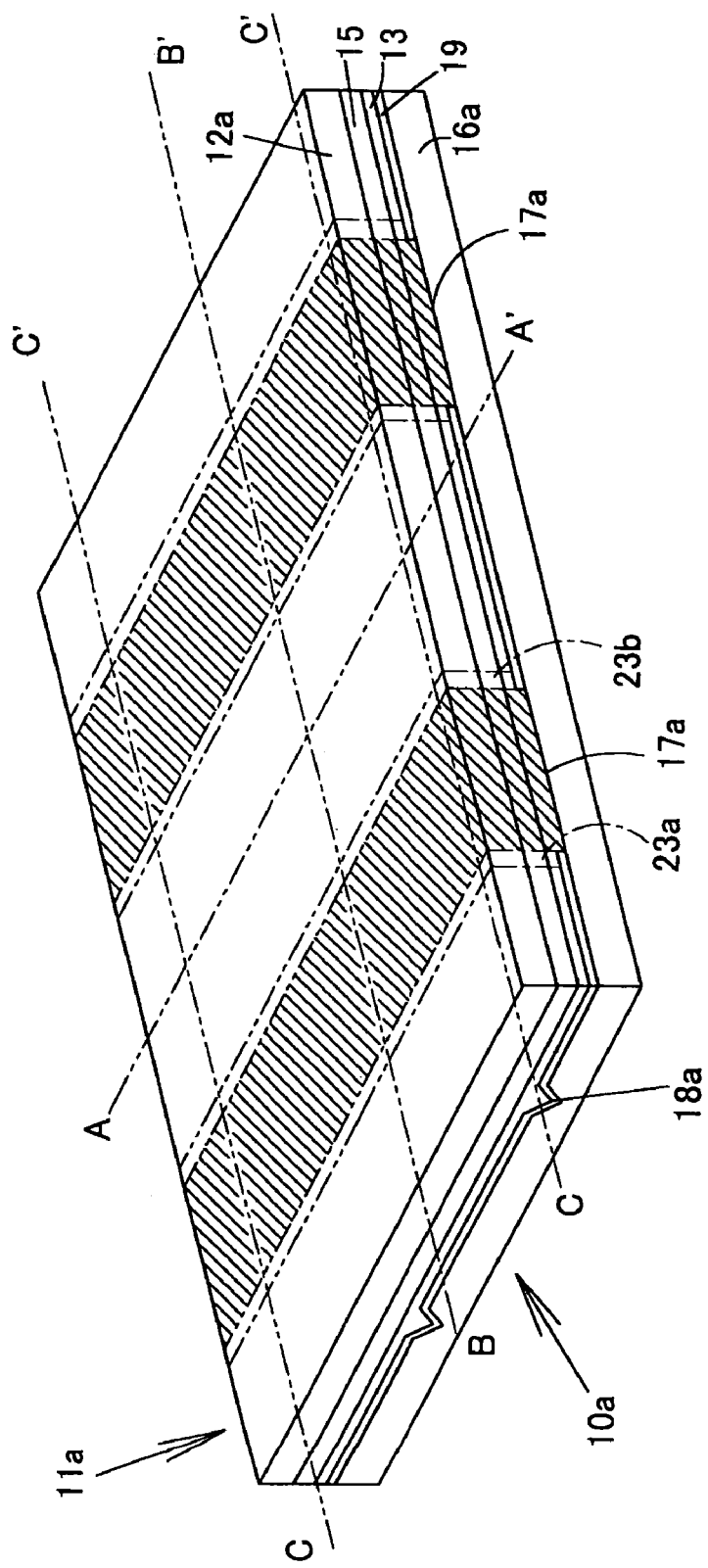
FIG. 11 shows a sequential view of FIG. 10.

Then, as shown in FIG. 11, the optical waveguide mother substrate 11a is turned upside down and put on the base substrate 10a and the optical waveguide mother substrate 11a is cut by a dicing blade to form isolation grooves 23a and 23b so that the isolation grooves 23a and 23b pass along edges of the waveguide mounting region 17a. In addition, an end face of the core 14 is formed at the same time by the cutting process of the isolation grooves 23a and 23b. Since the adhesive force between the metal thin film 19 and the upper clad layer 15 is small in a region in which the metal thin film 19 is formed on the surface of the base substrate 10a (a region outside the waveguide mounting region 17a) in the optical waveguide mother substrate 11a divided by the isolation grooves 23a and 23b, when force is applied to an unnecessary part in the divided optical waveguide mother substrate 11a (a region other than the waveguide mounting region), this unnecessary part can be easily removed from the base substrate 10a. Therefore, the optical waveguide 11a is remained in the region in which the core 14 is formed as shown by slanted lines in FIG. 11 and the optical fiber guides 18a to 18c of the base substrate 10a can be exposed. Each end face of the core 14 is exposed to the end face of the optical waveguide mother substrate 11a remained on the base substrate 10a. In addition, after the optical waveguide 11a is remained only in the region in which the core 14 is formed and the optical fiber guides 18a to 18c of the base substrate 10a are exposed, the metal thin film 19 may be etched away.

Figure 12:
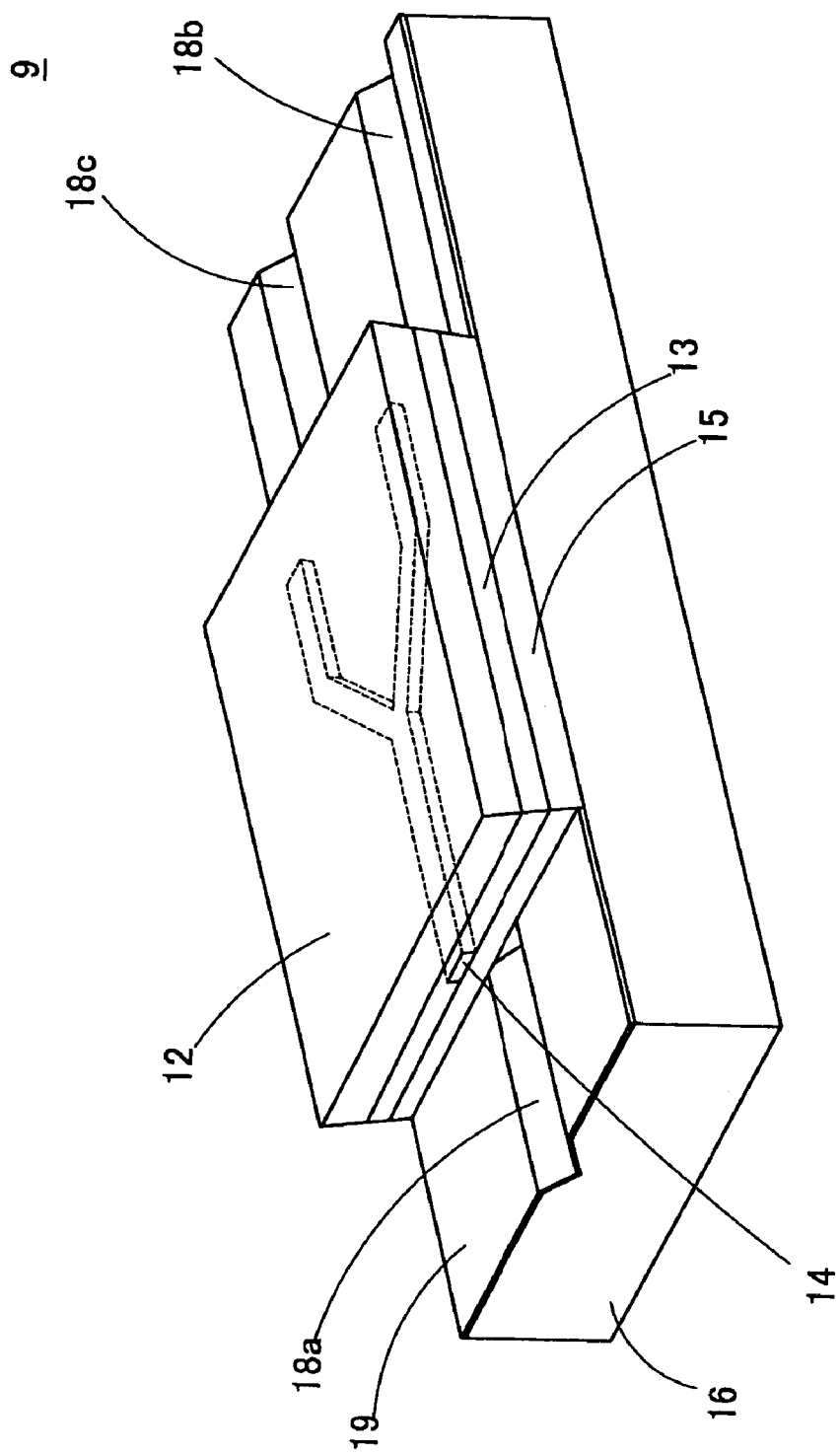
FIG. 12 shows a sequential view of FIG. 11.

Then, the end face to which the core 14 of the optical waveguide mother substrate 11a is exposed is cut obliquely by the dicing blade so that an angle formed between the end face to which the core 14 of the optical waveguide mother substrate 11a is exposed and the surface of the mounting substrate becomes an acute angle as shown in FIG. 5A. In addition, when the isolation grooves 23a and 23b are formed, that end face may be cut so that an angle formed between the end face to which the core 14 of the optical waveguide mother substrate 11a is exposed and the surface of the mounting substrate 10a becomes an acute angle. Then, the base substrate 10a and the optical waveguide mother substrate 11a are cut and divided along lines A-A', B-B' and C-C' in FIG. 11 so that a chip in which the optical waveguide 11a is bonded onto the mounting substrate 10a is provided as shown in FIG. 12. At this time, the unnecessary part remained on the optical waveguide mother substrate 11a is removed.

Then, the tip ends of the optical fibers 20a to 20c are cut so as to fit the angle formed between the end face to which the core 14 of the optical waveguide 11 is exposed and the surface of the mounting substrate 10, and the optical fibers 20a to 20c are fitted in the optical fiber guides 18a to 18c so that the tip end face of the optical fiber may be in contact with the end face to which the core 14 of the optical waveguide mother substrate 11a is exposed. Thus, in the state the optical fibers 20a to 20c are positioned by the optical fiber guides 18a to 18c, an adhesive agent is dropped from above to a space between the tip ends of the optical fibers 20a to 20c and the upper surface of the mounting substrate 10 to fix the optical fibers 20a to 20c, whereby the optical waveguide device 9 shown in FIG. 3 is completed.

In addition, although the end face of the optical fiber is cut at the same angle of the end face of the optical waveguide in the above embodiment of the present invention, when the upper face of the optical waveguide is higher than the upper face of the optical fiber, inclination of the end face of the optical fiber and inclination of the end face of the optical waveguide may be different. In addition, the end face of the optical fiber may be inclined in the opposite direction of the end face of the optical waveguide. When the upper face of the optical waveguide is higher than the upper face of the optical fiber, the optical fiber can be pressed downward as long as at least one position of the optical fiber is in contact with the end face of the optical waveguide regardless of the direction of the inclination or a degree of the inclination of the end face of the optical fiber.

However, in the case where the inclination of the end face of the optical fiber is large and the direction of the inclination of the end face of the optical fiber is opposite to the direction of the inclination of the end face of the optical waveguide, when the angle on the acute side of the tip end of the optical fiber is in contact with the end face of the optical waveguide, the abutting angle of the optical fiber could deform. Therefore, even when the inclination of the end face of the optical fiber is different from the inclination of the end face of the optical waveguide and its one part is in contact with the other part and there is a space between both end faces, it is preferable that the end face of the optical fiber is inclined in the same direction as the end face of the optical waveguide and an angle on an obtuse angle side of the tip end of the optical fiber is in contact with the end face of the optical waveguide. Alternatively, if the tip end on the acute angle side of the optical fiber is brought to escape into the optical fiber guide, the angle on the obtuse side of the optical waveguide may abut on the vicinity of the angle on the acute angle side of the tip end of the optical fiber.

In addition, when the end face of the optical fiber is not almost parallel to the end face of the optical waveguide, since there is a space formed between the end face of the optical fiber and the end face of the optical waveguide, an adhesive agent having almost the same refractive index as that of the core of the optical fiber and the core of the optical waveguide may be filled in this space.

Second Embodiment

Figure 13:
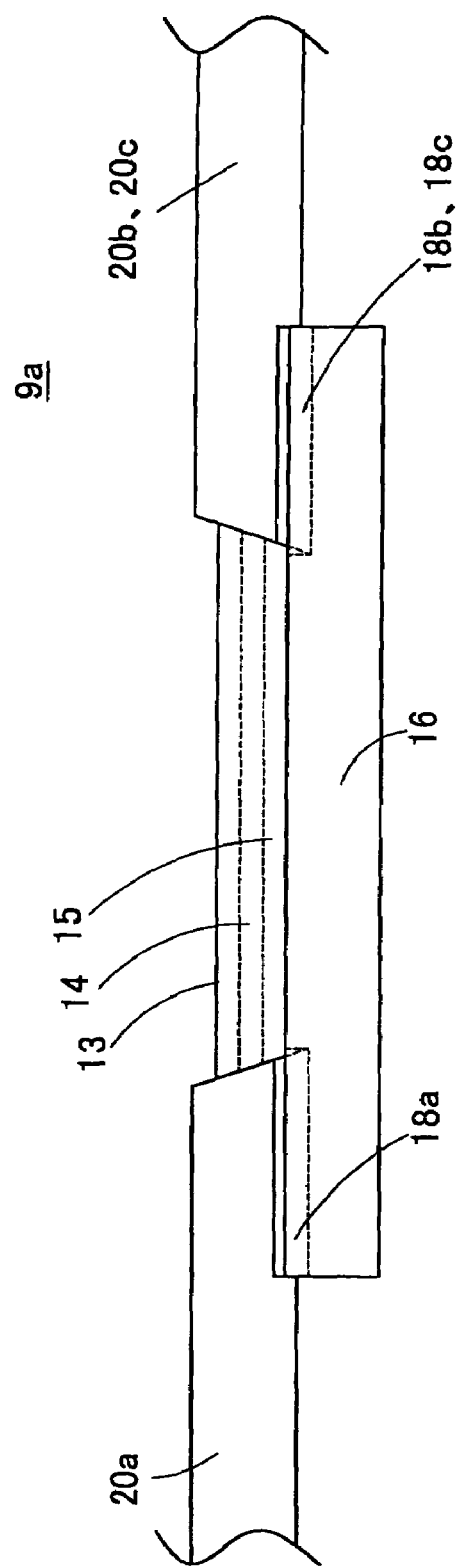
FIG. 13 shows a side view of an optical waveguide device according to another embodiment of the present invention.

FIG. 13 shows a side view of an optical waveguide device 9a according to an embodiment of the present invention. A second embodiment is the same as the first embodiment except that there is no cover glass 12. Similar to the first embodiment, in a state optical fibers 20a to 20c are fitted in optical fiber guides 18a to 18c to be positioned and bonded therein, tip end faces of the optical fibers 20a to 20c are get in under end faces of an optical waveguide 11. Therefore, the optical fibers 20a to 20c are positioned in a thickness direction of the optical waveguide 11 and prevented from lifting, and since they are fitted in the V-shaped optical fiber guides 18a to 18c, they are also positioned in a lateral width direction of the optical waveguide device 9a. Therefore, the tip ends of the optical fibers 20a to 20c do not lift because of warp age of the optical fiber itself or shift at the time of connection, and an optical axis of the core 14 is not likely to be shifted from an optical axes of the optical fibers 20a to 20c, so that the optical axes can be correctly aligned. Furthermore, since there is no cover glass 12, the optical waveguide device 9 can be more thinned as compared with the first embodiment.

Since a manufacturing method of the optical waveguide device according to the second embodiment is almost the same as that of the optical waveguide device described in the first embodiment, a part different from that in the first embodiment will be mainly described hereinafter.

Figure 14:
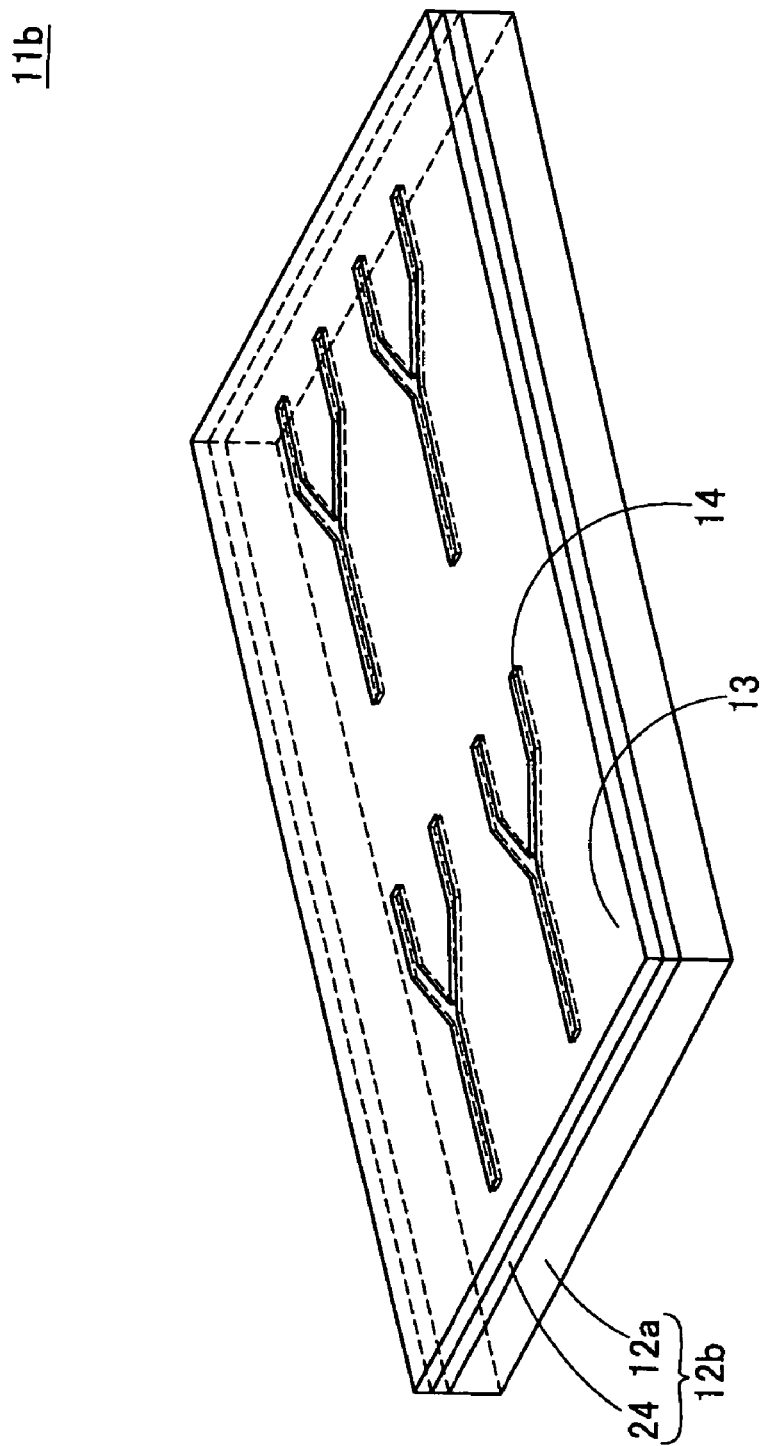
FIG. 14 shows a view to explain a manufacturing method of the optical waveguide device according to the embodiment in FIG. 13.

First, in the step of manufacturing the optical waveguide mother substrate 11b, a metal thin film 24 is formed on an entire surface of a glass substrate 12a on which a lower clad layer 13 will be formed, by vapor depositing, sputtering, or electroless depositing such metals as Ni, Au and the like to manufacture a glass substrate 12b as shown in FIG. 14. Similar to the manufacturing steps as described in the first embodiment, the lower clad layer 13 and a core 14 are sequentially formed on the glass substrate 12b to manufacture an optical waveguide mother substrate 11b.

Then, a base substrate 10a and an optical waveguide mother substrate 11b are bonded by a resin 15a serving as an adhesive agent which becomes an upper clad layer 15 and then isolation grooves 23a and 23b are formed by cutting the optical waveguide mother substrate 11b by a dicing blade. Then, an unnecessary part in which the core 14 of the optical waveguide mother substrate 11b is not formed is removed.

In addition, since adhesive force between the metal thin film 24 formed on the glass substrate 12b and the lower clad layer 13 is small, when force is applied to the glass substrate 12b, the glass substrate 12b can be easily removed from an interface of the lower clad layer 13. Thus, the optical waveguide 11b having the constitution of the second embodiment shown in FIG. 14 can be provided.

In addition, when an upper face of the optical waveguide is positioned lower than an upper face of the optical fiber like the second embodiment, if a direction of inclination of the end face of the optical fiber is opposite to that of the end face of the optical waveguide, the optical fiber cannot be pressed by the end face of the optical waveguide. However, as long as the end face of the optical fiber is almost parallel to the end face of the optical waveguide even in this embodiment, even when at least one position of the optical fiber is in contact with the end face of the optical waveguide and there is a space between the end face of the optical fiber and the end face of the optical waveguide, the optical fiber can be pressed downward.

In addition, when the end face of the optical fiber is not almost parallel to the end face of the optical waveguide, since there is a space between the end face of the optical fiber and the end face of the optical waveguide, an adhesive agent having almost the same refractive index as that of a core of the optical fiber and a core of the optical waveguide may be filled therein.

Third Embodiment

Figure 15:
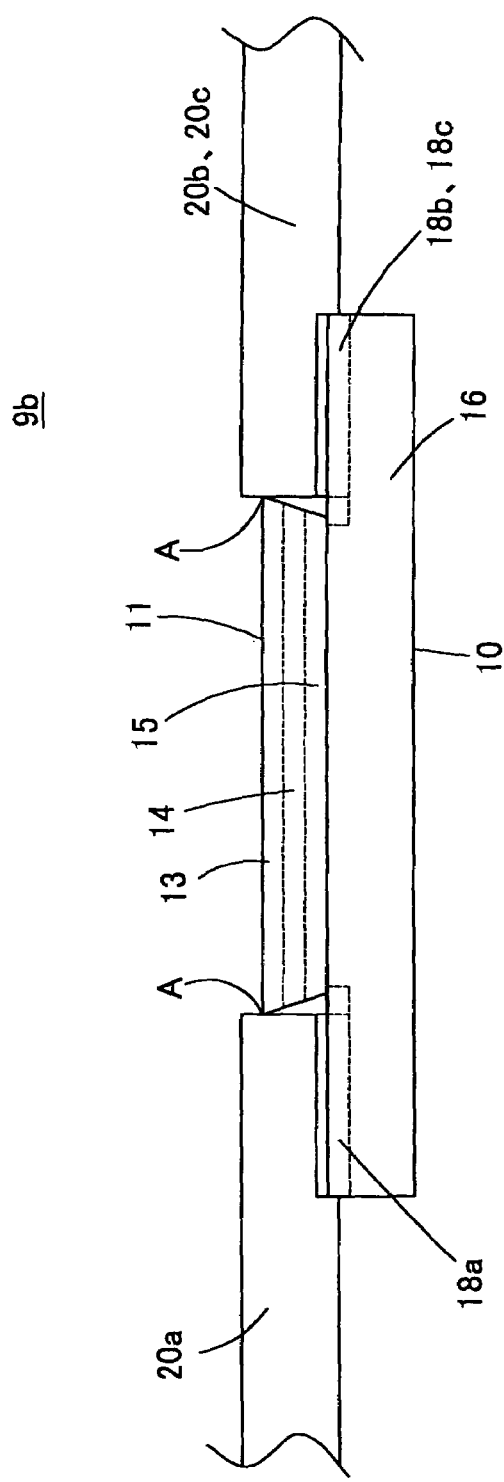
FIG. 15 shows a side view of an optical waveguide device according to still another embodiment of the present invention.

FIG. 15 shows a side view of an optical waveguide device 9b according to an embodiment of the present invention. According to the optical waveguide device 9b, a configuration of a tip end of an optical fiber is different from that in the second embodiment, and other parts have the same constitutions as those of the second embodiment.

Although the end faces of the optical fibers 20a to 20c are obliquely cut in the second embodiment, the end faces of optical fibers 20a to 20c are cut so as to be perpendicular to the optical axis direction in this embodiment. Meanwhile, since an upper face of an optical waveguide 11 is positioned lower than an upper face of the optical fibers 20a to 20c, a part of upper ends A formed to be an acute angle of the end face of the optical waveguide 11 abuts on the end faces of the optical fibers 20a to 20c.

Therefore, when the optical fibers 20a to 20c are fitted in optical fiber guides 18a to 18c to be positioned and bonded thereto, the space between the tip end faces of the optical fibers 20a to 20c and the end faces to which the core 14 of the optical waveguide mother substrate 1a is exposed is filled with an adhesive agent. Thus, since a lower part of the space is larger than an upper part of the space, an amount of the adhesive agent and hardening shrinkage of the adhesive agent are more at the lower part of the space than at the upper part. As a result, the tip ends of the optical fibers 20a to 20c are pulled downward by the hardening shrinkage of the adhesive agent. Therefore, the optical fibers 20a to 20c are positioned in the thickness direction of the optical waveguide device 9 and prevented from lifting, and they are also positioned in the lateral width direction of the optical waveguide device 9b by the V-shaped optical fiber guides 18a to 18c. Therefore, the tip ends of the optical fibers 20a to 20c do not lift due to the hardening shrinkage of the adhesive agent or the warp age of the optical fiber itself, and the optical axis of the core 14 and the optical axes of the optical fibers 20a to 20c are not likely to be shifted from each other.

In addition, since the manufacturing method of the optical waveguide device according to the third embodiment is only different from the manufacturing steps of the optical waveguide device in the first and second embodiments in the tip end configuration of the optical fiber, its description will be omitted.

Fourth Embodiment

Figure 16:
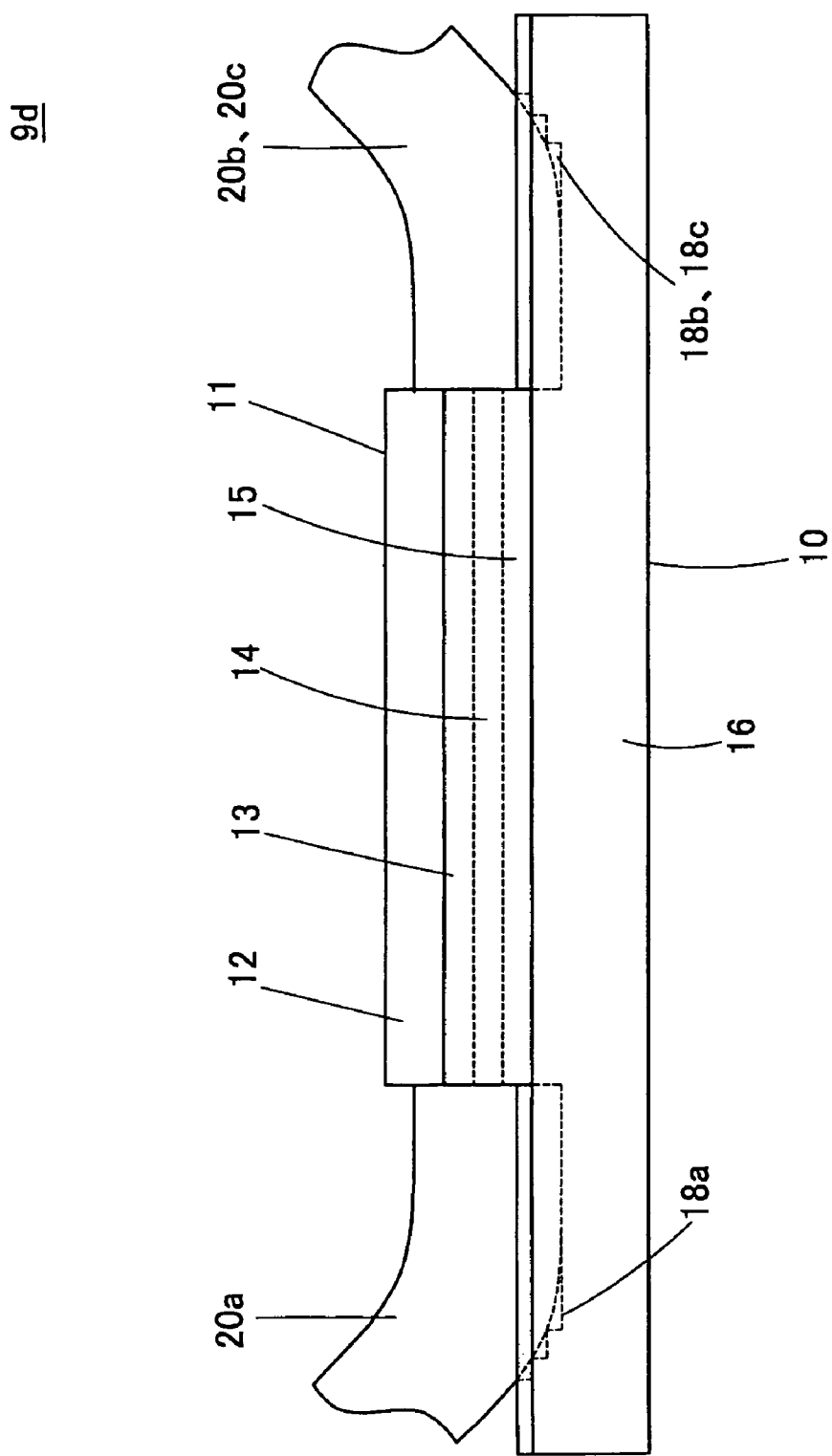
FIG. 16 shows a side view of an optical waveguide device according to still another embodiment of the present invention.

FIG. 16 shows a side view of an optical waveguide device 9d according to an embodiment of the present invention. According to the optical waveguide device 9d, ends of optical fiber guides 18a to 18c of a supporting substrate 16 are formed in the shape of steps and as they come close to the end of the support substrate 16, their depth is gradually decreased as shown in FIG. 16. When optical fibers 20a to 20c are fitted in the optical fiber guides 18a to 18c to be positioned and bonded thereto, respectively, the optical fibers 20a to 20c are bent upward at the end of the supporting substrate 16 and fixed thereto. At this time, elastic return force which forces the optical fibers 20a to 20c to return an original state (non-bent state) is generated. Since this elastic return force works to press the tip ends of the optical fibers 20a to 20c toward the optical fiber guides 18a to 18c, the tip ends of the optical fibers 20a to 20c are prevented from lifting.

Here, according to the supporting substrate 16, a surface of a silicon substrate (wafer) 16a is etched away to form a plurality of waveguide mounting regions 17a and optical fiber guides 18a to 18c similar to the first embodiment. At this time, depths of the optical fiber guides 18a to 18c at the ends of the supporting substrate 16 can be changed by repeating etching operations while the region to be etched away and the region not to be etched away are separated using a mask and the like.

Although the depths of the optical fiber guides 18a to 18c are changed by forming steps in the optical fiber guides 18a to 18c at the ends of the supporting substrate 16 in the forth embodiment, the depths of the optical fiber guides 18a to 18c may be changed by any form as long as the optical fibers 20a to 20c are bent upward at the ends of the supporting substrate 16 and fixed.

Fifth Embodiment

Figure 17:
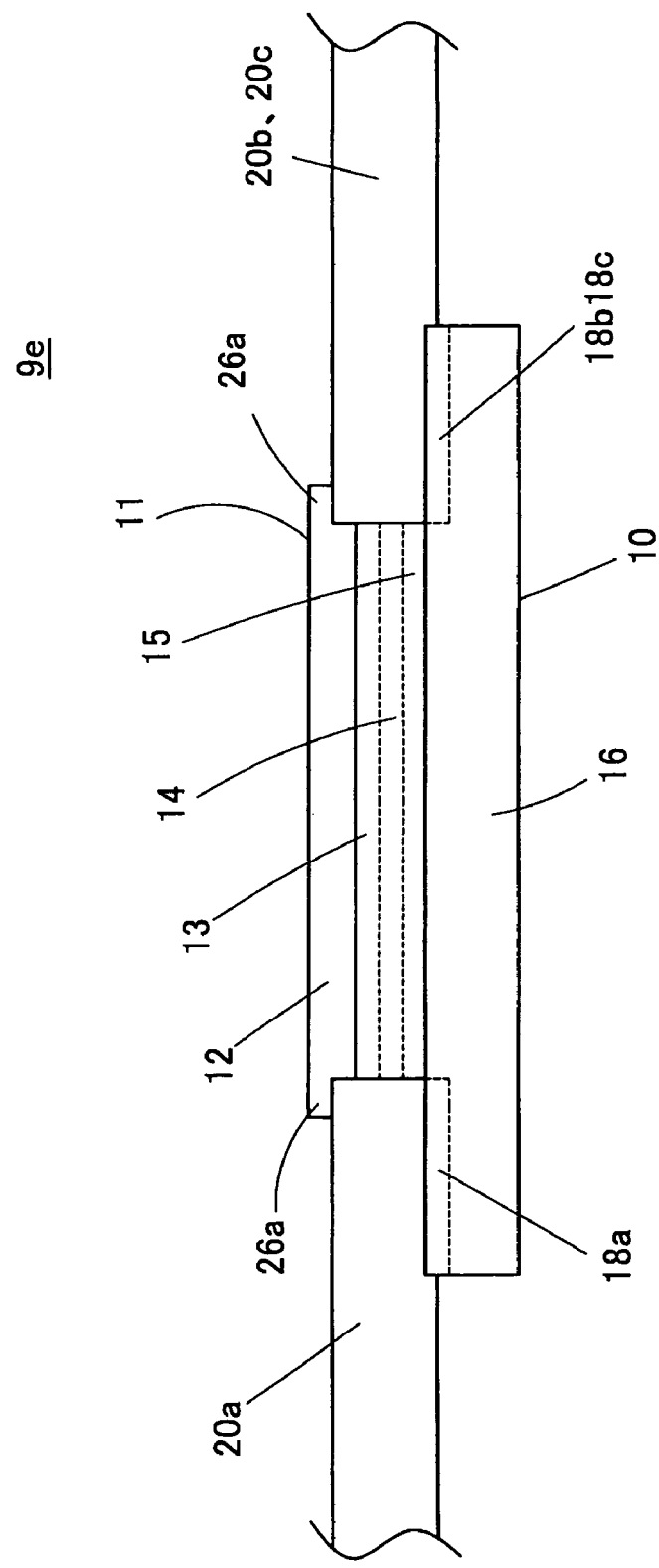
FIG. 17 shows a side view of an optical waveguide device according to still another embodiment of the present invention.

FIG. 17 shows a side view of an optical waveguide device 9e according to an embodiment of the present invention. According to the optical waveguide device 9e, as shown in FIG. 17, a part of an end face of a cover glass 12 of an optical waveguide 11 projects almost horizontally above the optical fiber guides 18a to 18c (that is, parallel to the length direction of the optical fiber guides 18a to 18c). More specifically, as shown in FIG. 17, when the optical waveguide device 9e is viewed from its side, a peak part 26a protrudes horizontally from the end face of the cover glass 12 and a recessed space is formed between an end face of the optical waveguide 11 and a mounting substrate 10.

When the optical fibers 20a to 20c are fitted in the optical fiber guides 18a to 18c, respectively, and tip ends of the optical fibers 20a to 20c are inserted into the recessed space, upper faces of the optical fibers 20a to 20c are pressed by a lower face of the peak part 26a, so that the ends of the optical fibers 20a to 20c are prevented from lifting.

Thus, the optical fibers 20a to 20c are positioned in a thickness direction of the optical waveguide device 9e and also positioned in a lateral width direction of the optical waveguide device 9e by the V-shaped optical fiber guides 18a to 18c, respectively.

Figure 18:
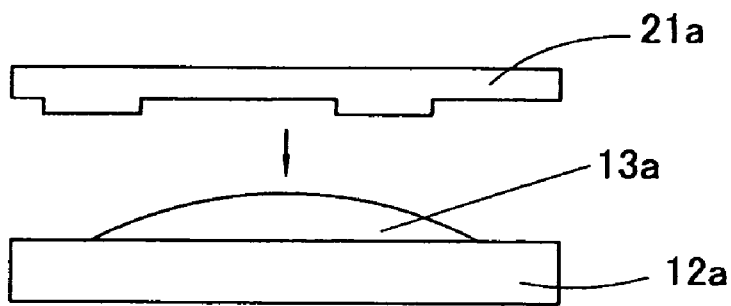
FIG. 18A-FIG. 18F show a view to explain a manufacturing method of the optical waveguide device according to the embodiment in FIG. 17.
Figure 18:
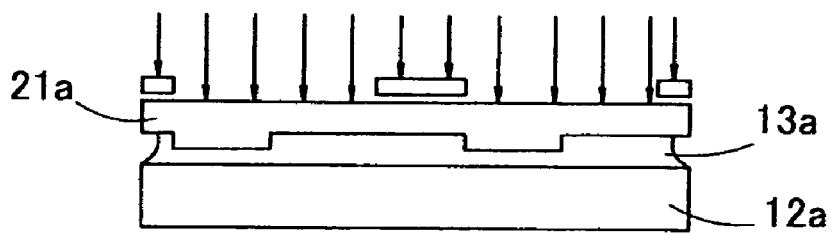
Figure 18:
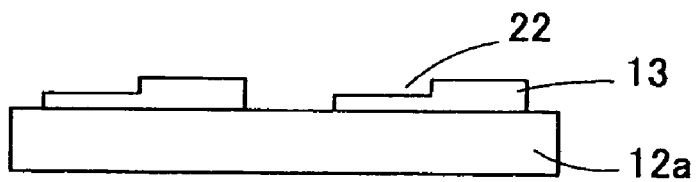
Figure 18:
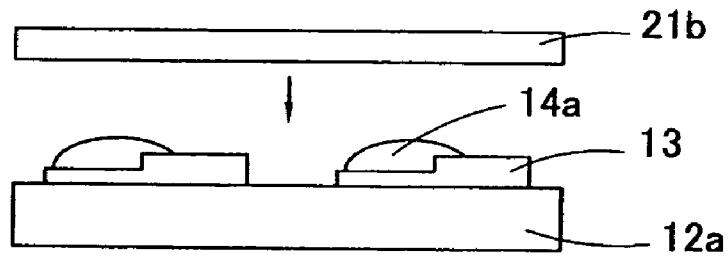
Figure 18:
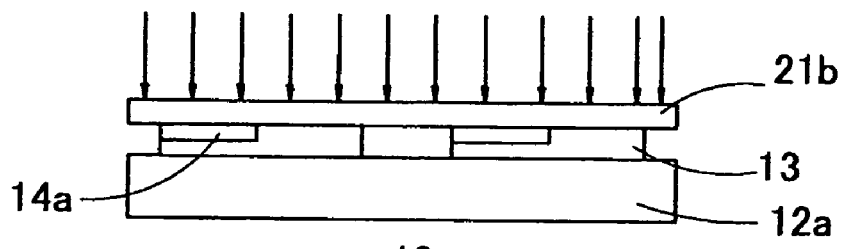
Figure 18:
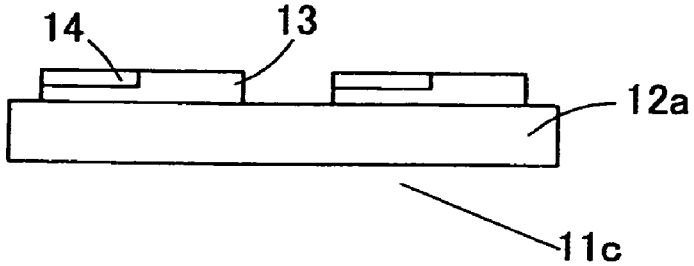

Here, a manufacturing method of the optical waveguide device 9e according to an embodiment of the present invention will be described with reference to FIGS. 18 to 20. FIGS. 18A to 18F show sectional views taken along line X-X' in FIG. 19. Manufacturing steps which are different from those of the optical waveguide device 9 described in the first embodiment will be mainly described.

First, similar to the first embodiment, an uncured UV cured resin (lower clad resin) 13a is dropped on a glass substrate 12a and the UV cured resin 13a is pressed with a stamper (mold) 21a having the same configuration as a core 14 to form a core groove 22 in the surface as shown in FIG. 18A. Then, the UV cured resin 13a is cured by UV irradiation and the lower clad layer 13 having the core groove 22 is molded as shown in FIG. 18C. At this time, as shown in FIG. 18B, only a region corresponding to the waveguide mounting region 17a of the base substrate 10a is irradiated with ultraviolet and other parts are covered with a mask and the like to cure the UV cured resin 13a. After the UV cured resin 13a is cured, an uncured UV cured resin 13a is removed by cleaning and the like.

Then, an uncured UV cured resin (core resin) 14a having a refractive index higher than that of the lower clad layer 13 is poured in the core groove 22 formed in the lower clad layer 13. Then, it is pressed by a stamper 21b so that its surface becomes flat and a thickness of a burr formed on the surface of the lower clad layer 13 by the UV cured resin 14a which overflowed from the core groove 22 becomes extremely thin. Then, the UV cured resin 14a is cured by UV irradiation, whereby the core 14 is formed in the core groove 22 and an optical waveguide mother substrate 11c is formed as shown in FIG. 18F. At this time, as shown in FIG. 18E, only a region corresponding to the waveguide mounting region 17a of the base substrate 10a is irradiated with ultraviolet and other parts are covered with a mask and the like to cure the UV cured resin 14a similar to the case the lower clad layer 13 is formed. After the UV cured resin 14a is cured, an uncured UV cured resin 14a is removed by cleaning and the like.

Figure 19:
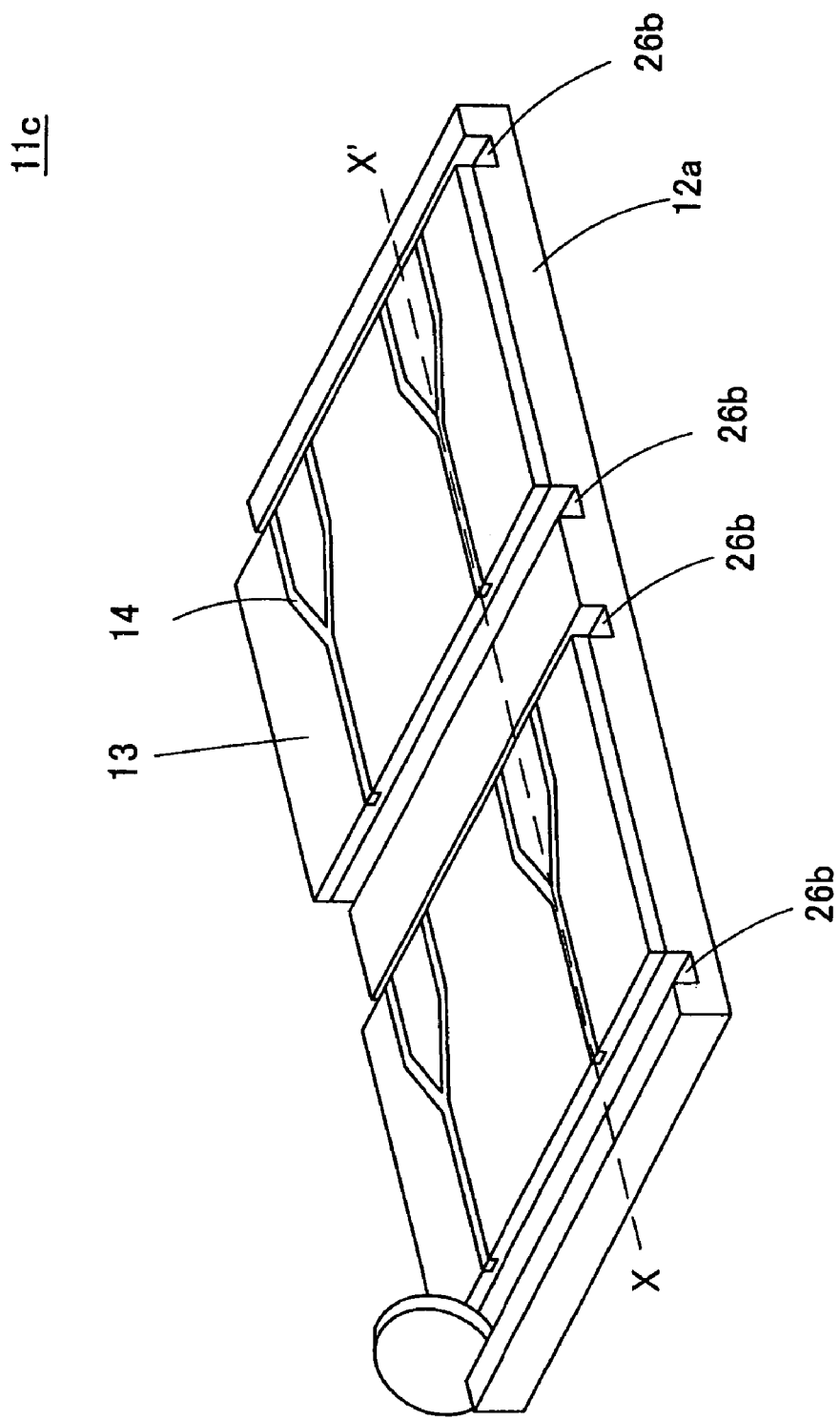
FIG. 19 shows a sequential view of FIG. 18.

Then, as shown in FIG. 19, an end face of the core 14 is formed by cutting the optical waveguide mother substrate 11c by a dicing blade which is moved to pass along an edge of the core 14 of the optical waveguide mother substrate 11c. At this time, as shown in FIG. 19, the glass substrate 12a is cut halfway to form a rectangular optical fiber cover groove 26b at the same time. In addition, the optical fiber cover groove 26b may be formed by etching the glass substrate 12a or the like.

Then, an uncured resin 15a is dropped on a surface of the optical waveguide mother substrate 11c and the optical waveguide mother substrate 11c and the base substrate 10a are bonded with the resin 15a. In addition, since the resin 15a becomes an upper clad layer 15 when cured, it is preferable that the resin 15a is the same UV cured resin as that of the lower clad layer 13 or it is the resin having the same degree of refractive index as that of the lower clad layer 13. Thus, its refractive index has to be lower than that of the cores 14 at least.

Figure 20:
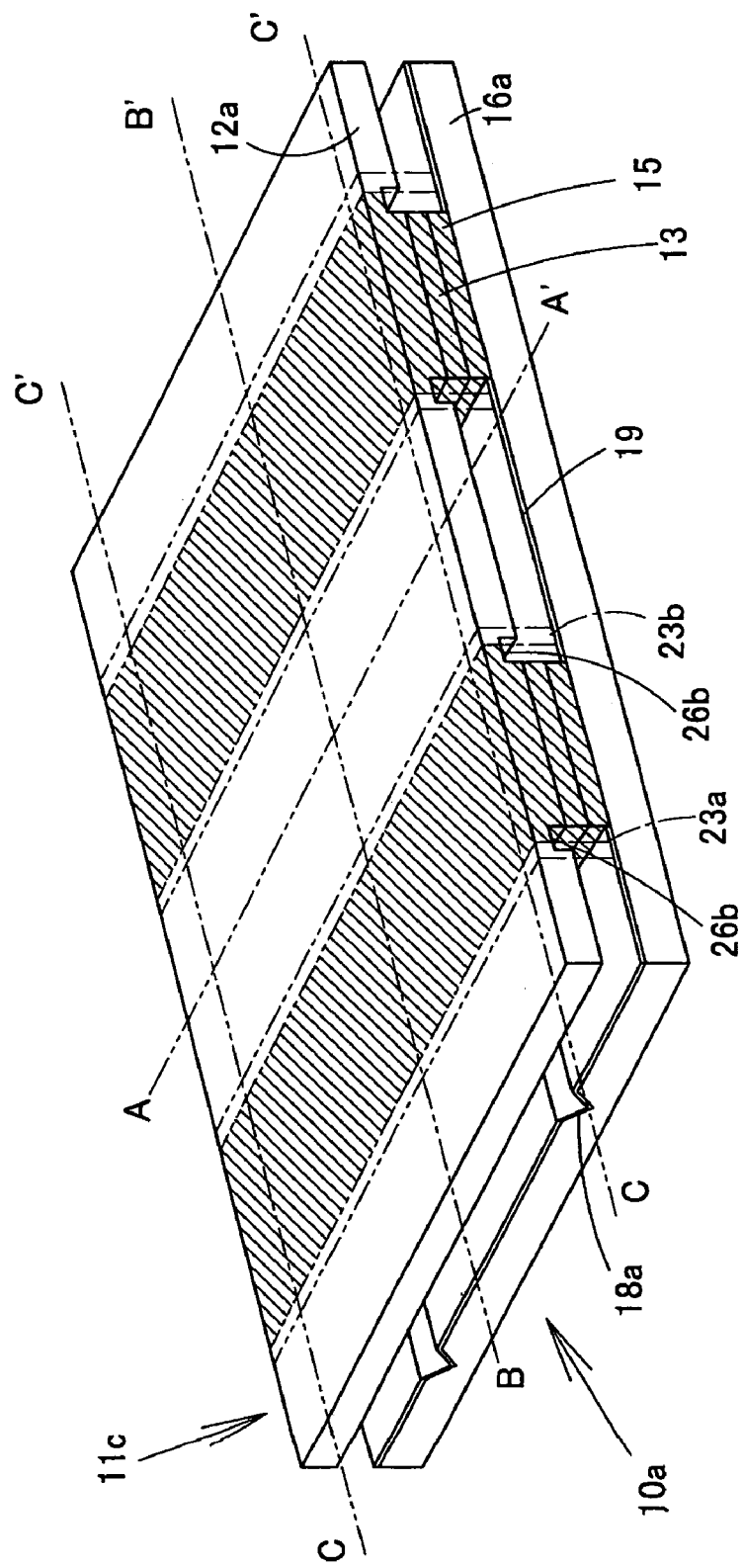
FIG. 20 shows a sequential view of FIG. 19.

Then, as shown in FIG. 20, the optical waveguide mother substrate 11c is put on the base substrate 10a and isolation grooves 23a and 23b are formed by cutting the optical waveguide mother substrate 11c by the dicing blade so that they pass along edges of a waveguide mounting region 17a. At this time, as shown in FIG. 20, a peak part 26a is formed when the isolation grooves 23a and 23b are formed so that a part of the optical fiber cover groove 26b formed in the optical waveguide mother substrate 11c is remained on the side on which the core 14 is formed. Since the adhesive force between a metal thin film 19 and the upper clad layer 15 is small in a region in which the metal thin film 19 is formed on the surface of the base substrate 10a (a region outside the waveguide mounting region 17a) in the optical waveguide mother substrate 11c divided by the isolation grooves 23a and 23b, when force is applied to an unnecessary part in the divided optical waveguide mother substrate 11c (a region other than the waveguide mounting region), this unnecessary part can be easily removed from the base substrate 10a. Therefore, only a region in which the core 14 is formed as shown by slanted lines in FIG. 20 is remained and the optical fiber guides 18a to 18c of the base substrate 10a can be exposed. Each end face of the core 14 is exposed to a peripheral face of the optical waveguide mother substrate 11c remaining on the base substrate 10a.

Figure 21:
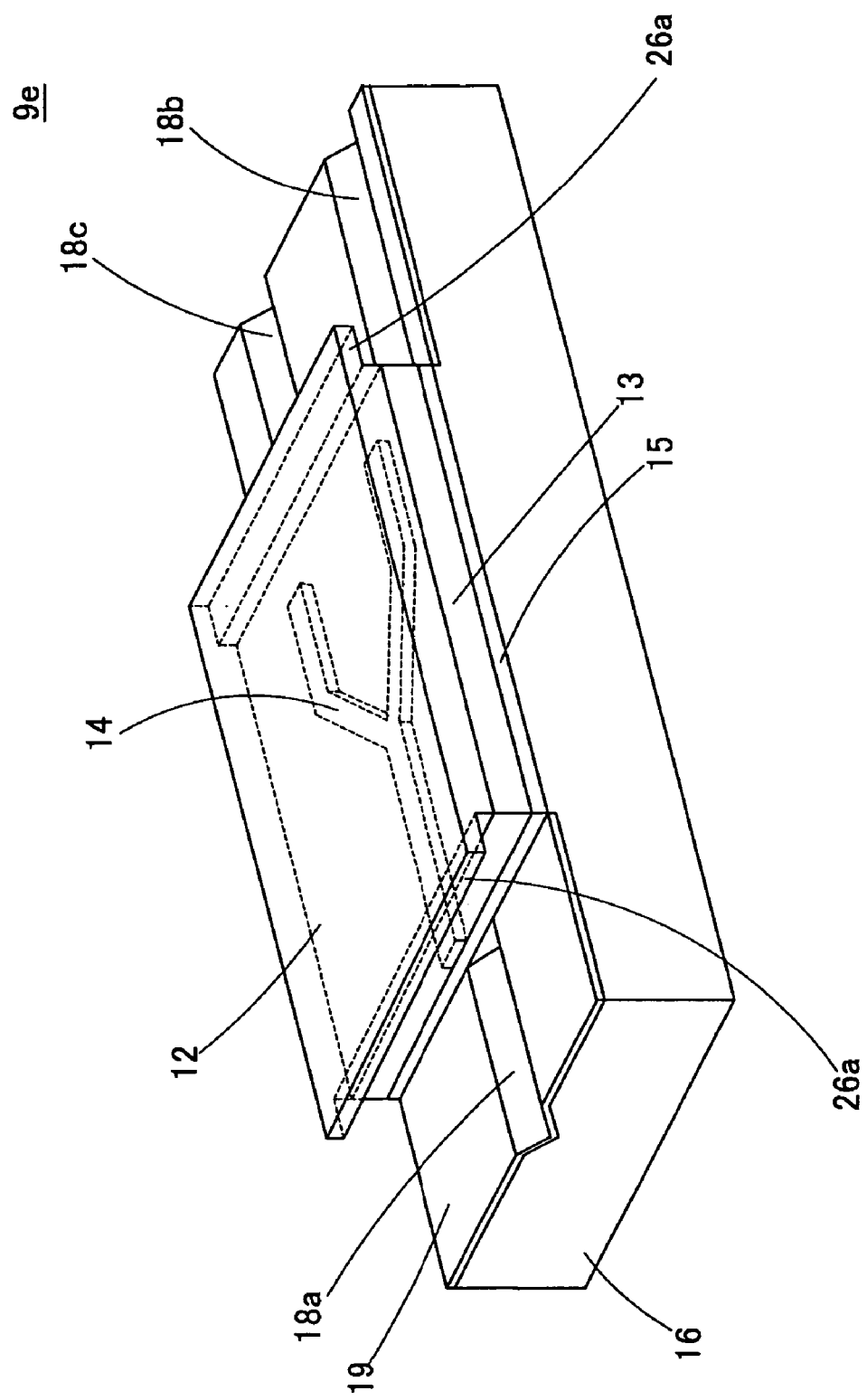
FIG. 21 shows a sequential view of FIG. 20.

Then, the base substrate 10a and the optical waveguide mother substrate 11c are cut and divided along lines A-A', B-B' and C-C' in FIG. 20 so that a chip in which the optical waveguide 11 is bonded onto the mounting substrate 10 is provided as shown in FIG. 21. At this time, the unnecessary part remained on the optical waveguide mother substrate 11c is removed.

Sixth Embodiment

Figure 22:
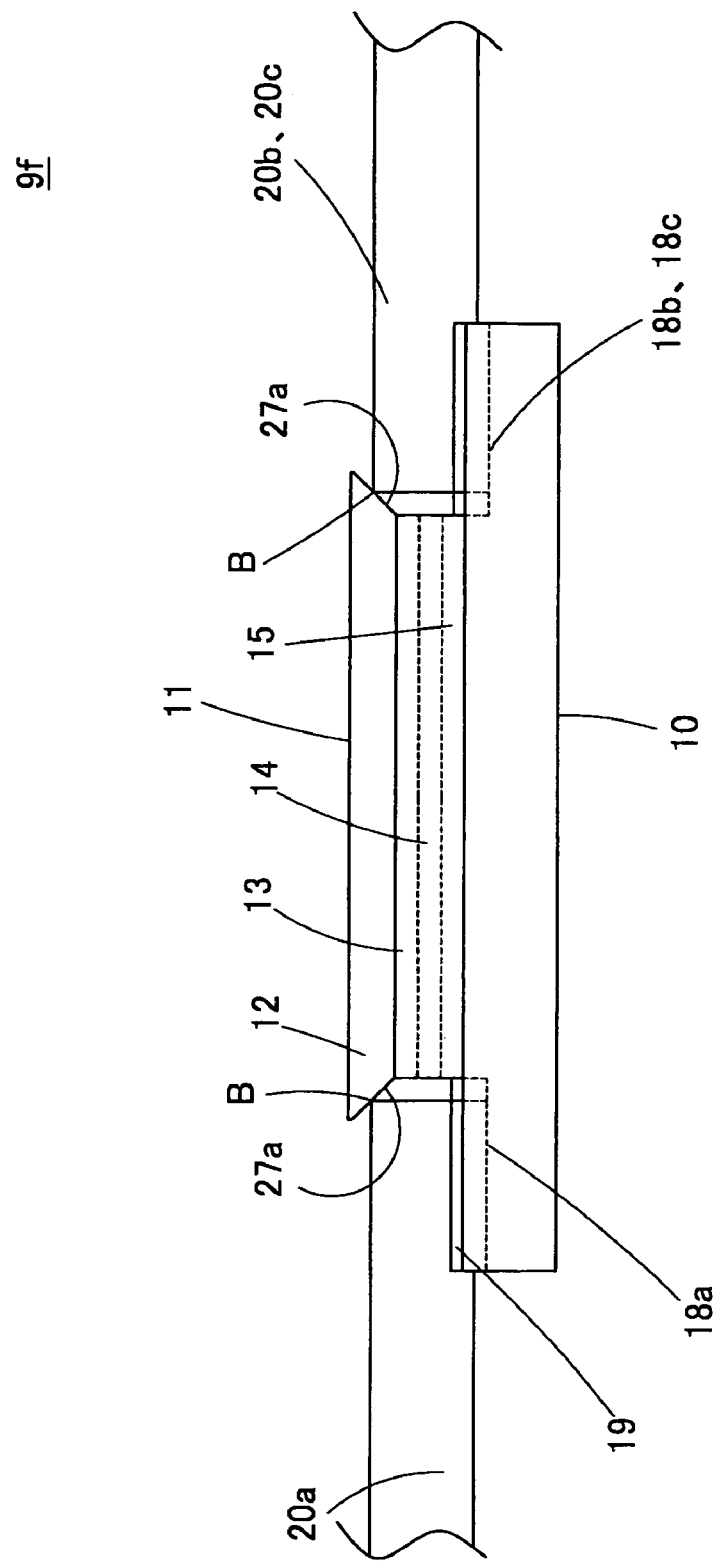
FIG. 22 shows a side view of an optical waveguide device according to still another embodiment of the present invention.

FIG. 22 shows a side view of an optical waveguide device 9f according to an embodiment of the present invention. As shown in FIG. 22, according to this optical waveguide device 9f, an end face of a cover glass 12 of an optical waveguide 11 is obliquely cut to form a slanted face 27a. Thus, corners of optical fibers 20a to 20c abut on the slanted face 27a of the cover glass 12. That is, the end face of the cover glass 12 is slanted and its upper part protrudes above optical fiber guides 18a to 18c and the slanted face 27a is in contact with an upper tip ends of the optical fibers 20a to 20c.

When the optical fibers 20a to 20c are fitted in the optical fiber guides 18a to 18c to be positioned and bonded thereto, if appropriate force is applied to an end face of a core 14 in an optical axis direction of the core 14, since corners of the optical fibers 20a to 20c abut on the slanted face 27a of the cover glass 12, the optical fibers 20a to 20c are pressed downward by the slanted face 27a of the cover glass 12 and fixed in the state in which force is apprised downward. Therefore, the optical fibers 20a to 20c can be fixed in a thickness direction of the optical waveguide device 9f and it is also fixed in a lateral width direction of the optical waveguide device 9f by the V-shaped optical fiber guides 18a to 18c. Thus, the tip ends of the optical fibers 20a to 20c are not likely to lift due to warp age of the optical fibers 20a to 20c themselves or positional shifting at the time of connection.

Figure 23:
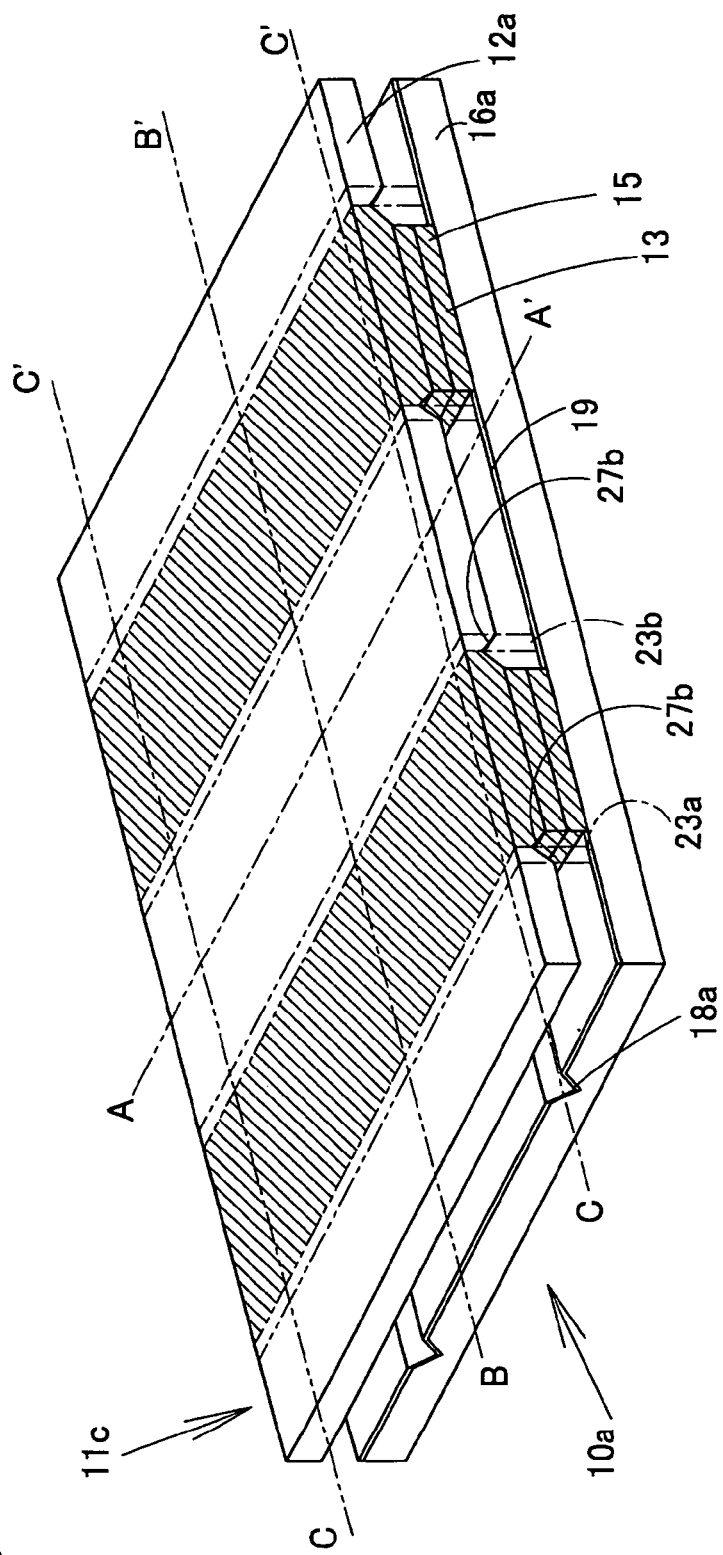
FIG. 23 shows a view to explain a manufacturing method of the optical waveguide device according to the embodiment in FIG. 22.

According to a manufacturing method of the optical waveguide device 9f, in the same step as that of forming the rectangular optical fiber cover groove 26b in the fifth embodiment, an end face of the core 14 is formed by cutting the optical waveguide mother substrate 11c by a dicing blade which is moved to pass along an edge of the core 14 of the optical waveguide mother substrate 11c, and then the glass substrate 12a is cut halfway with a V-shaped blade so that a V-shaped optical fiber cover groove 27b shown in FIG. 23 is formed as shown in FIG. 21.

Then, an uncured resin 15a is dropped on a surface of the optical waveguide mother substrate 11c and the optical waveguide mother substrate 11c and the base substrate 10a are bonded with the resin 15a. In addition, since the resin 15a becomes an upper clad layer 15 when cured, it is preferable that the resin 15a is the same UV cured resin as that of the lower clad layer 13 or it is the resin having the same degree of refractive index as that of the lower clad layer 13. Thus, its refractive index has to be lower than that of the cores 14 at least.

Then, as shown in FIG. 23, the optical waveguide mother substrate 11c is put on the base substrate 10a and isolation grooves 23a and 23b are formed by cutting the optical waveguide mother substrate 11c by the dicing blade so that they pass along edges of a waveguide mounting region 17a. At this time, as shown in FIG. 23, a slanted face 27a is formed in the cover glass 12 when the isolation grooves 23a and 23b are formed so that the dicing blade passes through the center of the V-shaped optical fiber cover groove 27b formed in the optical waveguide mother substrate 11c. Since the adhesive force between a metal thin film 19 and the upper clad layer 15 is small in a region in which the metal thin film 19 is formed on the surface of the base substrate 10a (a region outside the waveguide mounting region 17a) in the optical waveguide mother substrate 11c divided by the isolation grooves 23a and 23b, when force is applied to an unnecessary part in the divided optical waveguide mother substrate 11c (a region other than the waveguide mounting region), this unnecessary part can be easily removed from the base substrate 10a. Therefore, only a region in which the core 14 is formed as shown by slanted lines in FIG. 20 is remained and the optical fiber guides 18a to 18c of the base substrate 10a can be exposed. Each end face of the core 14 is exposed to a peripheral face of the optical waveguide mother substrate 11c remaining on the base substrate 10a.

In addition, the optical fiber held by the optical fiber guide may be pressed by a cover member such as a glass plate and the like in the optical waveguide device in each embodiment.

Figure 24:
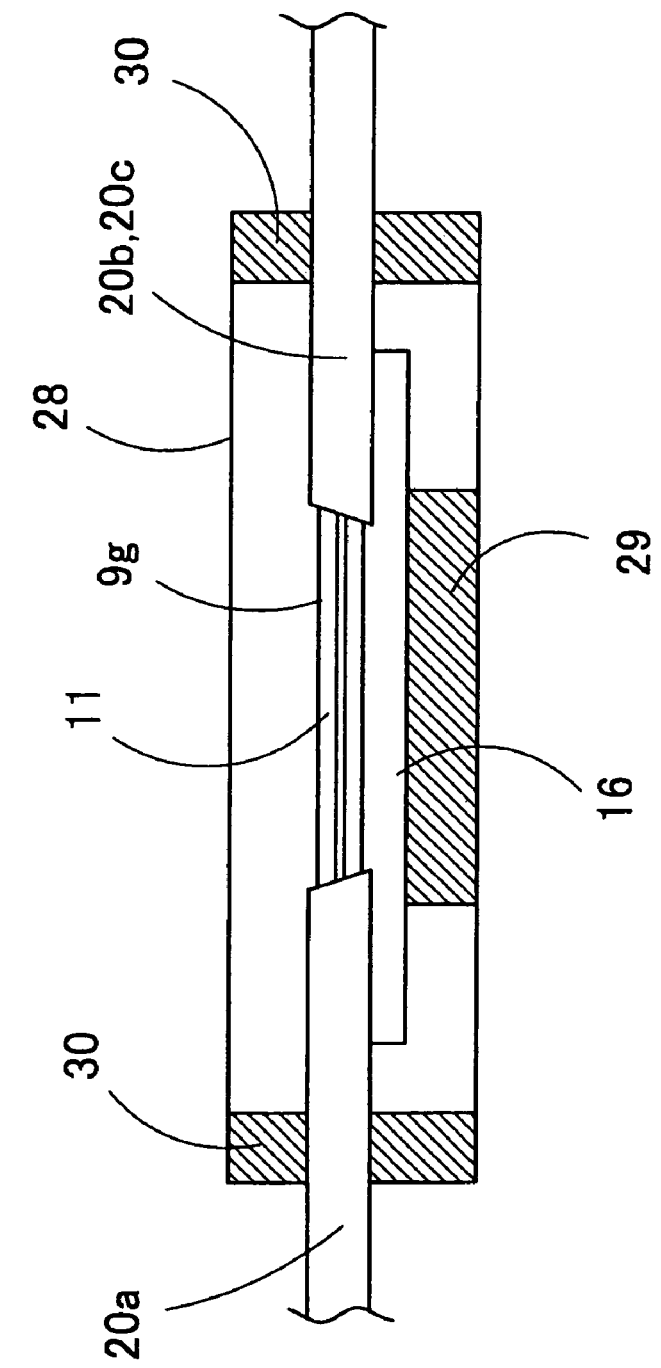
FIG. 24 shows a schematic sectional view of the optical waveguide device housed in a case.

In addition, as shown in FIG. 24, the optical waveguide device 9g may be housed in a case 28. That is, the optical waveguide device 9g is fixed on a holder 29 provided in the case 28 and the optical fibers 20a to 20c connected to the optical waveguide device 9g may be held by a fiber holding block 30 provided in the case 29.

What is claimed is:

1. An optical waveguide device comprising:
    a substrate having an optical fiber mounting region and an optical waveguide mounting region, wherein the optical fiber mounting region has formed therein an optical fiber guide to mount an optical fiber;
    an optical waveguide provided in the optical waveguide mounting region and comprising a core for propagating light and a clad layer surrounding the core; and
    an optical waveguide held by the optical fiber guide, wherein the optical waveguide has a slanted face slanting from a face perpendicular to a length direction of the optical fiber guide so as to extend above the optical fiber guide, in at least one part of an end face of the optical waveguide, and at least one part of an end face of the optical fiber held by the optical fiber guide is in contact with the slanted face provided on the end face of the optical waveguide;
    wherein the end face of the optical fiber is slanted in the same direction as that of the end face of the optical waveguide with respect to the face perpendicular to the length direction of the optical fiber guide, and inclination of the end face of the optical fiber from the perpendicular face is smaller than that of the end face of the optical waveguide from the perpendicular face so that a space is formed between the end face of the optical fiber and the end face of the optical waveguide.

2. An optical waveguide device comprising:
    a substrate having an optical fiber mounting region and an optical waveguide mounting region, wherein the optical fiber mounting region has formed therein an optical fiber guide to mount an optical fiber;
    an optical waveguide provided in the optical waveguide mounting region and comprising a core for propagating light and a clad layer surrounding the core; and
    an optical waveguide held by the optical fiber guide, wherein the optical waveguide has a slanted face slanting from a face perpendicular to a length direction of the optical fiber guide so as to extend above the optical fiber guide, in at least one part of an end face of the optical waveguide, and at least one part of an end face of the optical fiber held by the optical fiber guide is in contact with the slanted face provided on the end face of the optical waveguide;
    wherein an upper face of the optical waveguide is positioned higher than an upper face of the optical fiber.

3. An optical waveguide device comprising:
    a substrate having an optical fiber mounting region and an optical waveguide mounting region, wherein the optical fiber mounting region has formed therein an optical fiber guide to mount an optical fiber;
    an optical waveguide provided in the optical waveguide mounting region and comprising a core for propagating light and a clad layer surrounding the core; and
    an optical waveguide held by the optical fiber guide, wherein the optical waveguide has a slanted face slanting from a face perpendicular to a length direction of the optical fiber guide so as to extend above the optical fiber guide, in at least one part of an end face of the optical waveguide, and at least one part of an end face of the optical fiber held by the optical fiber guide is in contact with the slanted face provided on the end face of the optical waveguide;
    wherein an upper face of the optical waveguide is positioned lower than an upper face of the optical fiber and positioned higher than a central axis of the optical fiber;
    wherein the end face of the optical fiber is formed so as to be perpendicular to an optical axis direction of the optical fiber and a tip end of the slanted face formed in the end face of the optical waveguide is in contact with the end face of the optical fiber.

* * * * *